(12) United States Patent
Raphael et al.

(10) Patent No.: US 11,741,258 B2
(45) Date of Patent: Aug. 29, 2023

(54) DYNAMIC DATA DISSEMINATION UNDER DECLARATIVE DATA SUBJECT CONSTRAINTS

(71) Applicant: International Business Machines Corporation, Armonk, NY (US)

(72) Inventors: Roger C. Raphael, San Jose, CA (US); Rajesh M. Desai, San Jose, CA (US); Scott Schumacher, Porter Ranch, CA (US); Angineh Aghakiant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 17/301,857

(22) Filed: Apr. 16, 2021

(65) Prior Publication Data
US 2022/0335156 A1 Oct. 20, 2022

(51) Int. Cl.
*G06F 21/62* (2013.01)
*G06F 16/25* (2019.01)
*G06F 16/28* (2019.01)

(52) U.S. Cl.
CPC .......... *G06F 21/6245* (2013.01); *G06F 16/25* (2019.01); *G06F 16/284* (2019.01)

(58) Field of Classification Search
CPC ...... G06F 21/60; G06F 21/62; G06F 21/6218; G06F 21/6245; G06F 16/28; G06F 16/284; G06F 16/25
See application file for complete search history.

(56) References Cited

U.S. PATENT DOCUMENTS

| 7,548,908 B2 | 6/2009 | Fu et al. |
| 10,719,512 B2 | 7/2020 | Chainani et al. |
| 2006/0248592 A1* | 11/2006 | Agrawal ............. G06F 21/6245 707/999.009 |
| 2015/0161413 A1* | 6/2015 | Calem .................... G16H 10/60 705/51 |
| 2019/0080063 A1* | 3/2019 | Rice ...................... G06F 21/316 |
| 2019/0266350 A1* | 8/2019 | Barday .................. G06F 21/41 |
| 2020/0117824 A1* | 4/2020 | Upadhyay ............. G06F 16/258 |

FOREIGN PATENT DOCUMENTS

| CN | 103116599 A | 5/2013 |
| CN | 103678550 A | 3/2014 |
| CN | 104809182 A | 7/2015 |
| CN | 105653627 A | 6/2016 |
| CN | 105938480 A | 9/2016 |
| CN | 109150537 A | 1/2019 |

* cited by examiner

*Primary Examiner* — D'Arcy Winston Straub
(74) *Attorney, Agent, or Firm* — Yee & Associates, P.C.

(57) ABSTRACT

Dynamic data dissemination is provided. A resolved data subject identifier corresponding to a data subject is selected from a set of resolved data subject identifiers existing in rows of a data asset. In response to determining that the resolved data subject identifier does not correspond to a right to forget list, it is determined that the resolved data subject identifier corresponds to a data subject request list. The rows are transformed to anonymize existing pseudo and personal identifiers in cells of the rows that are tied to columns associated with data classes for which specific consent dimensions have been indicated as revoked by the data subject.

20 Claims, 15 Drawing Sheets

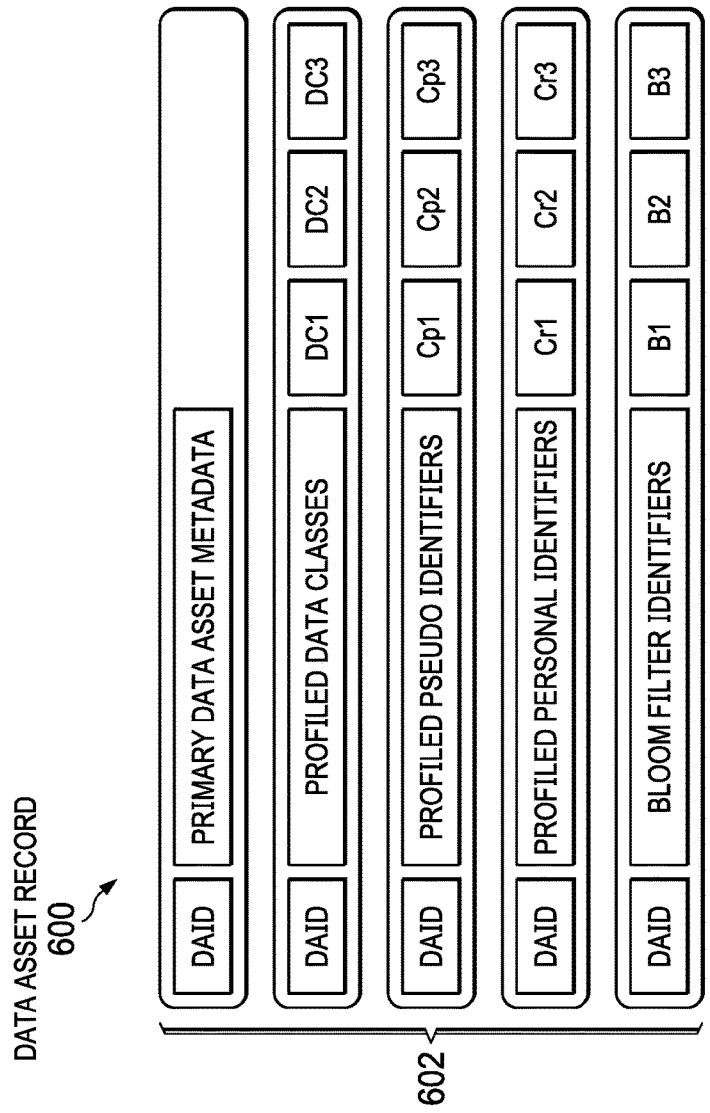
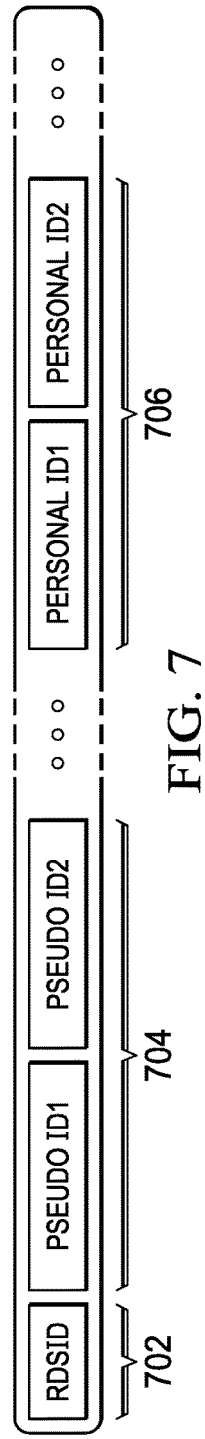
FIG. 6
FIG. 7

DYNAMIC DATA DISSEMINATION UNDER DECLARATIVE DATA SUBJECT CONSTRAINTS

BACKGROUND

1. Field

The disclosure relates generally to data dissemination and more specifically to dynamic data dissemination based on declarative data subject constraints on data consumers to protect data privacy with the objective to maintain the data at rest in original form with deferred but effectively consistent related dealiased data subject processing.

2. Description of the Related Art

Data dissemination is the distribution or transmitting of data to a data consumer. A data consumer may be, for example, an enterprise data user who can request data assets, one at a time, from a catalog of data assets for consumption.

Data privacy is the relationship between the collection and dissemination of data, expectation of data privacy, and regulatory issues surrounding them. Data privacy presents a challenge since data privacy attempts to use data, while protecting an individual's sensitive personal information or personally identifiable information. Sensitive personal information may be, for example, personal financial information, personal medical or health information, personal education records, personal employment records, and the like, corresponding to a particular person. Personally identifiable information is any information, such as, for example, name, address, telephone number, social security number, credit card number, and the like, corresponding to an identifiable person that can be used to identify that particular person. Data privacy aims to strike a balance between individual privacy rights, while still allowing data to be used for business purposes, for example.

A data subject is any person who can be identified either directly or indirectly via collected data. In other words, a data subject is a person whose personal data can be collected and used to identity that particular person. Consent of a data subject means any freely given, specific, informed, and unambiguous indication of the data subject's wishes by which the data subject, by a statement or by a clear affirmative action, signifies agreement to the processing and specific use of some or all personal data relating to the data subject by a data consumer. A data subject may be, for example, a customer of an enterprise, which is the data consumer.

SUMMARY

According to one illustrative embodiment, a computer-implemented method for dynamic data dissemination is provided. A computer selects a resolved data subject identifier corresponding to a data subject from a set of resolved data subject identifiers existing in rows of a data asset. In response to the computer determining that the resolved data subject identifier does not correspond to a right to forget list, the computer determines that the resolved data subject identifier corresponds to a partial consent revocation by the data subject in a data subject request list. The computer transforms the rows to anonymize existing pseudo and personal identifiers in cells of the rows that are tied to columns associated with data classes for which specific consent dimensions have been indicated as revoked by the data subject in a data subject record corresponding to the resolved data subject identifier using a "but not"/antijoin filter. According to other illustrative embodiments, a computer system and computer program product for dynamic data dissemination are provided.

BRIEF DESCRIPTION OF THE DRAWINGS

FIG. 6 is a diagram illustrating an example of a data asset record in accordance with an illustrative embodiment;

FIG. 7 is a diagram illustrating an example of a resolved data subject identity longitudinal record in accordance with an illustrative embodiment;

DETAILED DESCRIPTION

Figure 1:
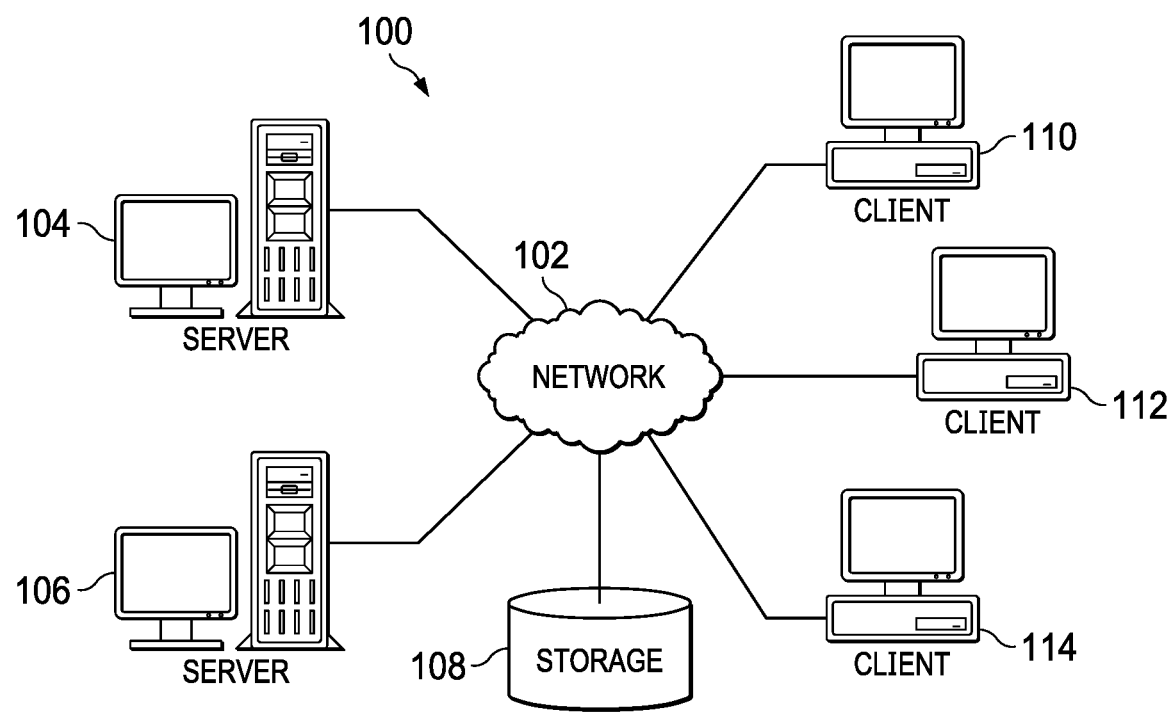
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
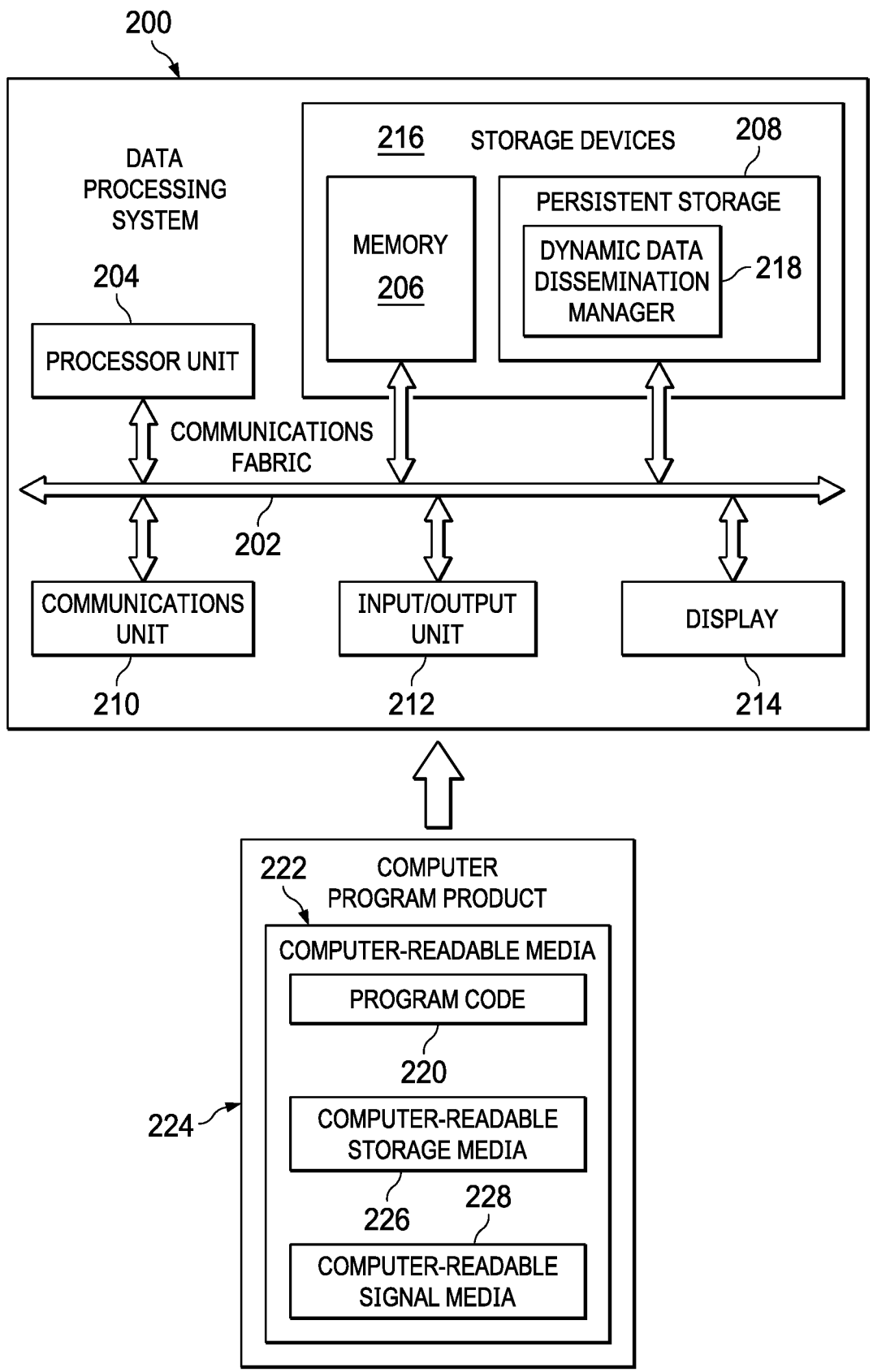
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide dynamic data dissemination services based on data subject constraints on data consumers to protect data privacy of data subjects. Data subject constraints may include, for example, data subject consent to the use and dissemination of information corresponding to the data subject, intent of the data consumer to utilize the information corresponding to the data subject for a specific purpose, regulatory data retention restrictions regarding the information corresponding to the data subject, and the like. Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users (i.e., data consumers) corresponding to clients 110, 112, and 114 may utilize clients 110, 112, and 114 to access data assets hosted or protected by server 104 and server 106. The data assets hosted or protected by server 104 and server 106 may be any type of data set (e.g., transaction data, marketing data, financial data, healthcare data, or the like), which contains sensitive data (e.g., name, address, telephone number, social security number, credit card number, and the like) that can personally identify individuals and is not available for access without specific consent by the individuals.

Storage 108 is a network storage device capable of storing any type of data in a structured format or an unstructured format. In addition, storage 108 may represent a plurality of network storage devices. Further, storage 108 may store a plurality of different data assets, which are protected by server 104 and server 106. Furthermore, storage 108 may store other types of data, such as authentication or credential data that may include usernames, passwords, and biometric templates associated with client device users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the dynamic data dissemination processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores dynamic data dissemination manager 218. However, it should be noted that even though dynamic data dissemination manager 218 is illustrated as residing in persistent storage 208, in an alternative illustrative embodiment, dynamic data dissemination manager 218 may be a separate component of data processing system 200. For example, dynamic data dissemination manager 218 may be a hardware component coupled to communication fabric 202 or a combination of hardware and software components. In another alternative illustrative embodiment, a first set of components of dynamic data dissemination manager 218 may be located in data processing system 200 and a second set of components of dynamic data dissemination manager 218 may be located in a second data processing system, such as, for example, server 106 in FIG. 1.

Dynamic data dissemination manager 218 controls the process of disseminating information corresponding to data subjects dynamically at runtime based on data subject constraints, such as consent, intent, purpose, and retention, on data consumers to protect data privacy of the data subjects. It should be noted that dynamic data dissemination manager 218 may be comprised of a plurality of different components, such as, for example, a consent manager component, a data asset catalog component, a data asset profiler component, a data subject identity resolver component, a Bloom filter manager component, a dynamic data dissemination processor component, and the like. As a result, data processing system 200 operates as a special purpose computer system in which dynamic data dissemination manager 218 in data processing system 200 enables selective dissemination of information corresponding to respective data subjects to different data consumers based on query and data subject constraints. In particular, dynamic data dissemination manager 218 transforms data processing system 200 into a special purpose computer system as compared to currently available general computer systems that do not have dynamic data dissemination manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

In the world of data dissemination, the concept of data subject constraints includes, for example, consent, intent, purpose, retention, and the like. Consent means that a data subject agrees to the processing of all or only a specified portion of collected data corresponding to the data subject. Intent means the declared goal or objective of a data consumer to utilize collected data corresponding to data subjects. A data consumer may be, for example, an enterprise data user who can request data assets, one at a time, from a catalog of data assets for consumption. Purpose means that the data subject agrees to the intent of the data consumer to utilize the collected data for a specific purpose. Retention means that the data consumer has regulatory constraints regarding time of retention and sensitivity of data corresponding to specific data subjects.

A data subject is a resolved identity that exists as rows in data assets. A data asset can contain a plurality of data subjects, repeatedly (e.g., a data asset containing credit card transactions). In addition, a data asset can contain zero or more random pseudo identifiers or zero or more real personal identifiers corresponding to data subjects. As used herein, a resolved data subject identifier is a resolved identifier that may be associated with a number of aliases of a particular data subject with minor variants in pseudo identifiers or personal identifiers corresponding to that particular data subject.

A data asset can be a structured data set such as a rectangular data set, which is comprised of columns and rows, stored in a technical data storage system (e.g., a database management system or the like) or an unstructured data set. The technical data storage system either has an issued data dissemination query from a data consumer that can be intercepted and rewritten at dissemination time or has filtering capabilities integrated or build outside called a data access layer.

To dynamically process data in accordance with data asset access requests (data queries) to a data controller, the data controller's obligation to the data subject, and the data subject constraints listed above, all the data subjects that may be identified in the requested data asset require dynamic filtering at the row (e.g., tuple) level because the data subject constraints can change at any point in time due to, for example, a right to forget request, a data subject right request, consent revocation, or the like. A right to forget request means that a data subject is requesting removal (i.e., physical deletion) of all collected data corresponding to the data subject. In other words, a right to forget request is a complete revocation of consent. A data subject right request means that a data subject is requesting an action (e.g., obtain copies, request corrections, restrict processing, delete data, partially or fully revoke consent, and the like) on collected data corresponding to the data subject. Partial revocation means that a data subject is revoking consent to process and disseminate a portion of the data corresponding to the data subject for a specific purpose by the data consumer. Processing personal data of data subjects by data consumers consists of using this personal data to, for example, evaluate certain aspects of the data subjects, such as interests, behaviors, routines, buying patterns, and the like.

It should be noted that a right to forget request is an extremely expensive operation to perform because the operation requires a deep purging (i.e., physical deletion) of all of the data corresponding to the data subject that made the request. In addition, the operation should be done in phases, while maintaining referential integrity among data assets. Further, the cost of locating data by data subject, which includes de-aliasing data subject aliases, is very expensive. Furthermore, it should be noted that an obligation exists to perform the right to forget request in a fixed period of time (e.g., 30 days) to conform to the request. Also, in the best interest of the enterprise, the right to forget request should be performed as quickly as possible to decrease filtering and increase system performance.

Current solutions statically preprocess and clean data assets on a predetermined time interval basis to reflect the latest state of right to forget and consent revocation requests of all data subjects included in the data assets. These current solutions are costly and time consuming. Illustrative embodiments instead provide dynamic data dissemination using Bloom filters to achieve the same effect at runtime. A Bloom filter is a space-efficient probabilistic data structure used to test whether an element is a member of a set. The Bloom filters are able to pinpoint the hierarchical nature of a data asset that could be affected, as well as provide dynamic row filter generation and operator insertion directly into the data asset in a data consumption path to achieve the right constraints at any point in time.

Dynamic data dissemination means that illustrative embodiments do not preprocess data assets before runtime, but instead process data assets dynamically at runtime. In other words, dynamic data dissemination means that different data is sent to different data consumers based on received query (i.e., requested data) in real time.

Illustrative embodiments utilize Bloom filters for data subject to data asset mapping for space and time optimization during data subject right request and right to forget request computations. Illustrative embodiments provide a consistent, asynchronous approach to identifying and/or purging of data subject information. For example, illustrative embodiments may perform data subject purging in batches based on a predetermined time interval or number of requests received for optimal performance. Illustrative embodiments achieve space optimization because the state of Bloom filters requires far less storage than indexing. Illustrative embodiments achieve time optimization because the Bloom filters provide a means of knowing whether a real identifier of a data subject is not present in any of the data asset, catalog, project, and data source Bloom filter levels. In addition, illustrative embodiments may achieve time optimization by profiling historic data sets asynchronously or synchronously so that no catch up is required at runtime. Further, illustrative embodiments may achieve time optimization because the process is inherently parallelizable to improve throughput of both data subject profiling for Bloom filter building and dynamic data dissemination processes.

Illustrative embodiments also utilize a data subject identity resolver for aliasing problems regarding real personal identifiers (e.g., name and the like) and pseudo identifiers (e.g., social security number, credit card number, address, date of birth, salary, healthcare information, and the like) corresponding to data subjects that could occur in data assets to perform data subject de-aliasing. The data subject identity resolver allows one or more personal identifiers and/or one or more pseudo identifiers to be resolved probabilistically or by other means to a longitudinal record having all known distinct personal and pseudo identifiers corresponding to a resolved data subject identity. Moreover, illustrative embodiments find necessary join keys based on personal and pseudo identifiers corresponding to data subjects for the right to forget request list, the data subject right request list, and the data asset that is disseminated.

A data subject record provides declarative constraints on data consumers by a data subject in a data subject request list for partial consent revocations or in a right to forget list for complete consent revocation. The data subject performs this via data subject requests and right to forget requests to a consent manager that maintains the data subject request list and the right to forget list separately using a resolved data subject identity key corresponding to the data subject. The data subject request contains partial or full consent revocation for specific consent dimensions. The right to forget request contains an instruction to physically delete all information corresponding to the data subject or to permanently anonymize all of the information.

When a new data asset is received from a data source, illustrative embodiments utilize a data profiler to profile the data asset to identify data subjects contained in the data asset and utilize a data asset catalog to store the data asset, along with a reference to the data source of the data asset. Illustrative embodiments utilize this information to idempotently populate the Bloom filters. Illustrative embodiments accumulate the Bloom filters based on a user-defined hierarchy. The hierarchy may be, for example, a data asset Bloom filter, a data source Bloom filter, a project Bloom filter, a data asset catalog Bloom filter, and the like.

If a data asset already exists in the data asset catalog, then illustrative embodiments utilize a bootstrap process to build the data subject information per data source using the Bloom filters. Illustrative embodiments utilize a consent manager to track data subject requests and responses. Illustrative embodiments utilize two subprocesses (i.e., dynamic filtering and deep purging) to fulfill data subject requests. For dynamic inline filtering of structured data in rectangular form, illustrative embodiments may utilize, for example, structured query language query rewrite. For dynamic filtering of unstructured data, illustrative embodiments may utilize, for example, obfuscation or redaction in real time.

At the data source level, illustrative embodiments know the type of dynamic filtering that is needed (e.g., query rewrite for structured data and obfuscation for unstructured data). Unstructured data may be, for example, data subject with offset information (e.g., location spans) where data alias information is present, which can also be populated by the data profiler. This is a space/time optimization, which does not need indexing. For deep purging of data corresponding to a data subject requests, instead of searching all data sources, illustrative embodiments to optimize performance only search data sources containing relevant data subject information. Completion of the deep purge data subject request is accomplished by illustrative embodiments sending a notification to the consent manager regarding the deep purge corresponding to the data subject. Thus, illustrative embodiments seamlessly handle data subject requests (e.g., data subject right requests or right to forget requests) without blocking and ensure correct data dissemination for every data asset request by data consumers.

Thus, illustrative embodiments provide one or more technical solutions that overcome a technical problem with disseminating data containing sensitive information regarding data subjects. As a result, these one or more technical solutions provide a technical effect and practical application in the field of data privacy and security.

Figure 3:
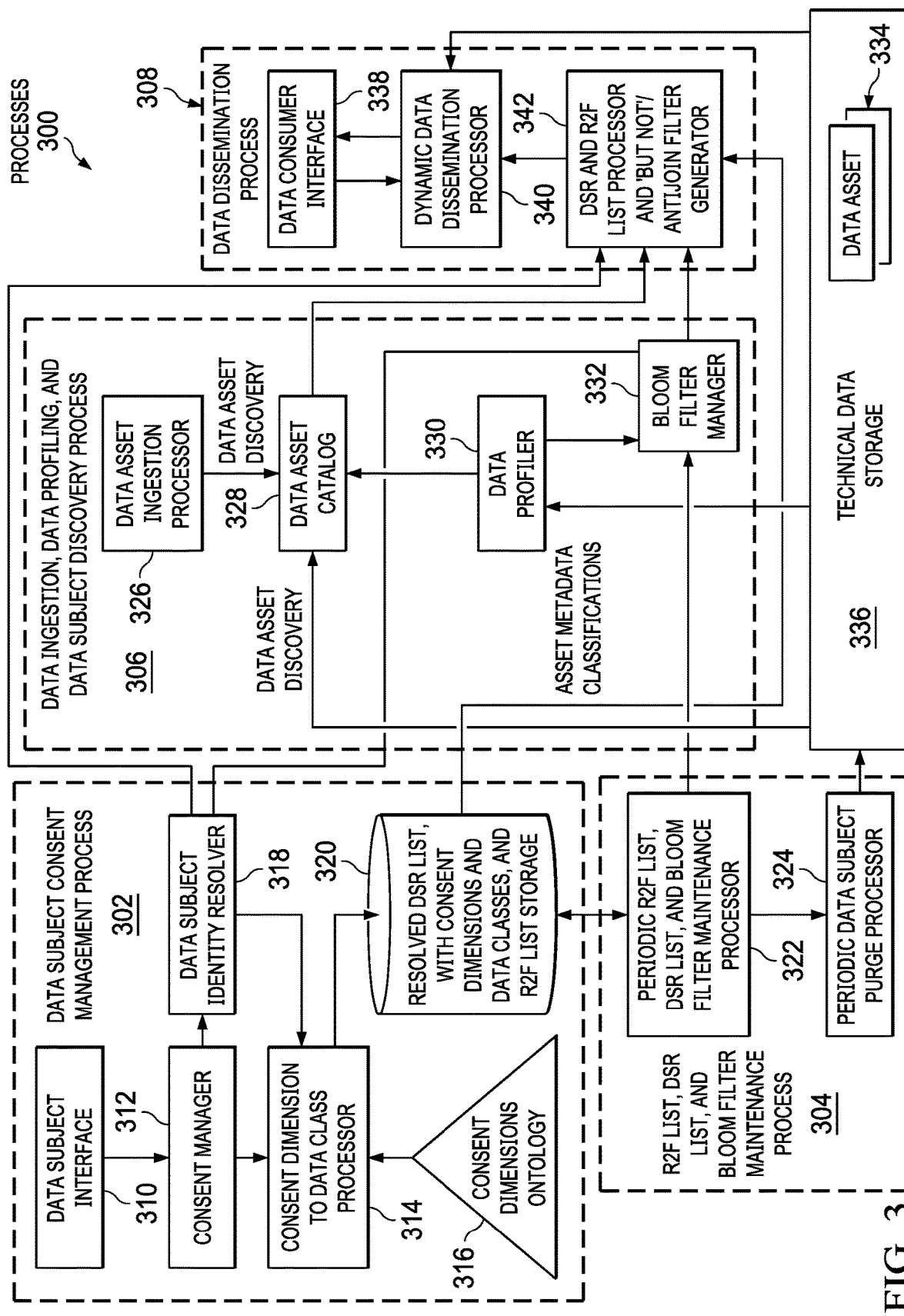
FIG. 3 is a diagram illustrating an example of processes in accordance with an illustrative embodiment.

With reference now to FIG. 3, a diagram illustrating example processes is depicted in accordance with an illustrative embodiment. Processes 300 may be implemented in a computer, such as server 104 in FIG. 1 or data processing system 200 in FIG. 2. For example, processes 300 may be implemented in and/or controlled by a dynamic data dissemination manager, such as, for example, dynamic data dissemination manager 218 in FIG. 2. In this example, processes 300 include data subject consent management process 302, right to forget (R2F) list, data subject request (DSR) list, and Bloom filter maintenance process 304, data ingestion, data profiling, and data subject discovery process 306, and data dissemination process 308.

Data subject consent management process 302 manages consent and revocation of consent by respective data subjects. Data subject consent management process 302 includes data subject interface 310, consent manager 312, consent dimension to data class processor 314, consent dimensions ontology 316, data subject identity resolver 318, and resolved data subject requests list with consent dimensions and data classes and right to forget list storage 320. Data subject interface 310 enables a data subject to send data subject requests for granting and denying consent for respective consent dimensions specific to a line of business for an enterprise and right to forget requests for physical deletion of all information corresponding to the data subject or non-reversible anonymization of the information to consent manager 312. Consent manager 312 manages the declarative data subject constraints on the data consumer of the enterprise contained in the data subject requests and right to forget requests made by the data subject. Consent manager 312 utilizes consent dimension to data class processor 314 to map consent dimensions of the data subject to data classes of interest for each respective data asset. Consent dimension to data class processor 314 retrieves consent dimensions from consent dimensions ontology 316. Consent dimensions ontology 316 is a static set of consent dimensions for the line of business of the enterprise. Consent manager 312 utilizes data subject identity resolver 318 to resolve aliases of the data subject to a single identity for the data subject (i.e., a resolved data subject identifier). Consent dimension to data class processor 314 records the resolved data subject identifier, consent dimensions to data classes, data subject requests, and right to forget requests corresponding to the data subject in resolved data subject requests list with consent dimensions and data classes and right to forget list storage 320.

Right to forget list, data subject request list, and Bloom filter maintenance process 304 includes periodic right to forget list, data subject request list, and Bloom filter maintenance processor 322 and periodic data subject purge processor 324. Right to forget list, data subject request list, and Bloom filter maintenance process 304 utilizes periodic right to forget list, data subject request list, and Bloom filter maintenance processor 322 to maintain and update the right to forget list and data subject request list stored in resolved data subject requests list with consent dimensions and data classes and right to forget list storage 320 and Bloom filters stored in Bloom filter manager 332 on a predetermined time interval basis or on demand. In addition, right to forget list, data subject request list, and Bloom filter maintenance process 304 utilizes periodic data subject purge processor 324 to selectively remove resolved data subject identifiers from the right to forget list and the data subject request list on the predetermined time interval basis or on demand.

Data ingestion, data profiling, and data subject discovery process 306 includes data asset ingestion processor 326, data asset catalog 328, data profiler 330, and Bloom filter manager 332. Data ingestion, data profiling, and data subject discovery process 306 utilizes data asset ingestion processor 326 to discover and ingest new data assets from a set of data sources. Data ingestion, data profiling, and data subject discovery process 306 utilizes data asset catalog 328 to catalog and list all new and existing data assets, such as data assets 334, stored in technical data storage 336. Data assets 334 represent a plurality of different data assets. Technical data storage 336 may be, for example, a database management system that stores data in a relational format, such as tables comprised of columns and rows. For example, one table may represent one data asset. Data ingestion, data profiling, and data subject discovery process 306 utilizes data profiler 330 to profile each respective data asset of data assets 334 to identify personal identifiers, pseudo identifiers, data classes of interest, and the like corresponding to data subjects. Data ingestion, data profiling, and data subject discovery process 306 utilizes Bloom filter manager 332 to generate a user-defined hierarchy of Bloom filters. The Bloom filter hierarchy may include, for example, a data asset specific Bloom filter, a data source specific Bloom filter, a project specific Bloom filter, a data asset catalog specific Bloom filter, and the like. Bloom filter manager 332 utilizes the Bloom filter hierarchy to quickly identify all data assets in any data source, project, or data asset catalog containing personal or pseudo identifiers corresponding to resolved identities of data subjects.

Data dissemination process 308 includes data consumer interface 338, dynamic data dissemination processor 340, and data subject request and right to forget processor and "but not"/antijoin filter generator 342. Data dissemination process 308 utilizes data consumer interface 338 to receive requests for data (i.e., data queries) from a data consumer corresponding to an enterprise and present results of the data requests to the data consumer. Data dissemination process 308 utilizes data subject request and right to forget processor and "but not"/antijoin filter generator 342 to analyze the data subject request and right to forget lists and apply a generated "but not"/antijoin filter to determine which data (i.e., personal and/or pseudo identifiers of particular data subjects) are not to be included in a particular data consumer request. Data dissemination processor 340 utilizes the information provided by data subject request and right to forget processor and "but not"/antijoin filter generator 342 to dynamically disseminate the appropriate data to the data consumer based on the declarative data subject constraints.

Figure 4:
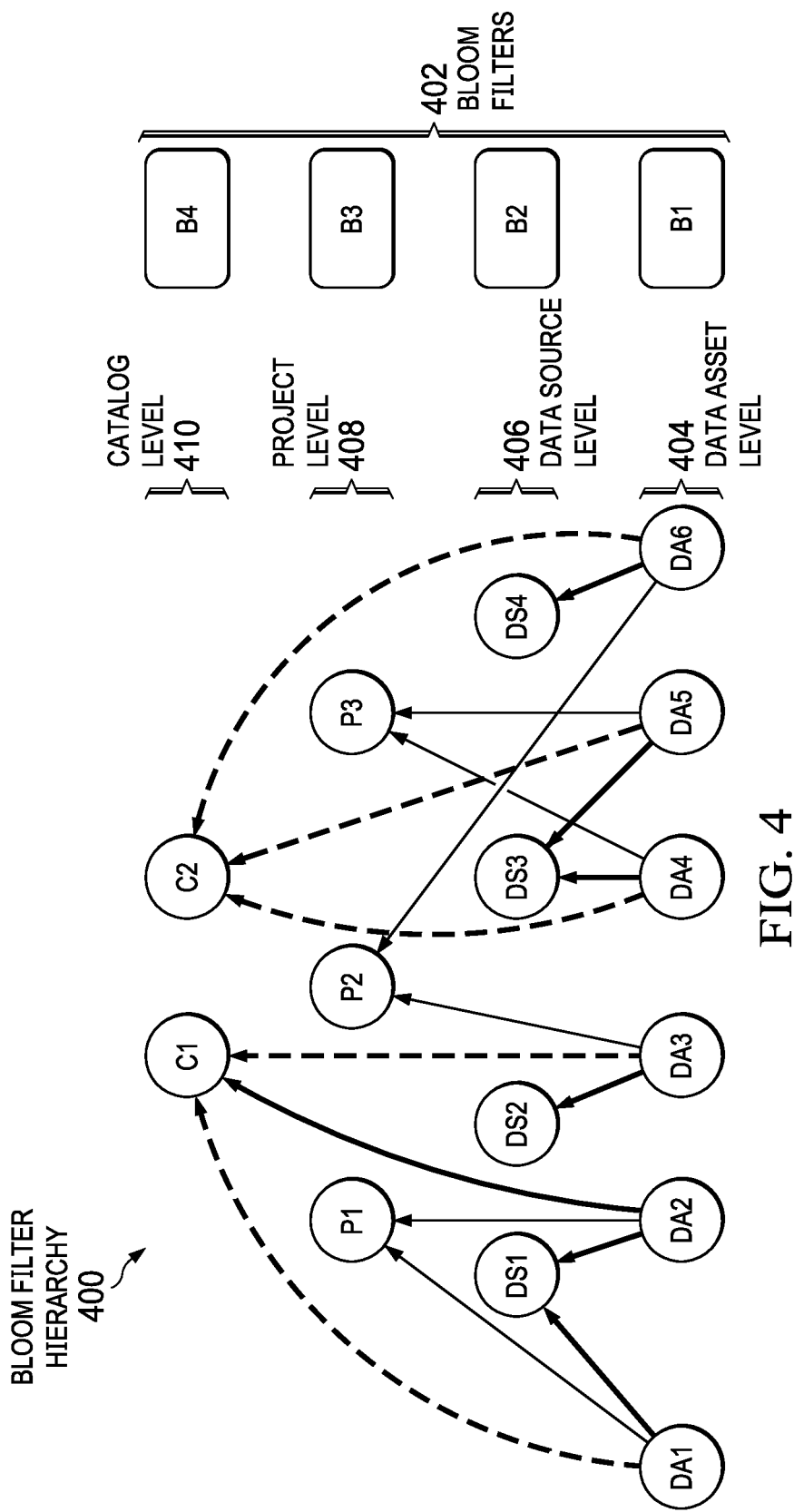
FIG. 4 is a diagram illustrating an example of a Bloom filter hierarchy in accordance with an illustrative embodiment.

With reference now to FIG. 4, a diagram illustrating an example of a Bloom filter hierarchy is depicted in accordance with an illustrative embodiment. Bloom filter hierarchy 400 may be implemented in a Bloom filter manager, such as Bloom filter manager 332 in FIG. 3.

In this example, Bloom filter hierarchy 400 includes Bloom filters 402. Bloom filters 402 include a plurality of different Bloom filters. For example, Bloom filters 402 include data asset level Bloom filter 404, data source level Bloom filter 406, project level Bloom filter 408, and catalog level Bloom filter 410. Data asset level Bloom filter 404 represents a Bloom filter specific to respective data assets. Data source level Bloom filter 406 represents a Bloom filter specific to sources of respective data assets. Project level Bloom filter 408 represents a Bloom filter specific to respective projects of an enterprise using respective data assets. Catalog level Bloom filter 410 represents a Bloom filter specific to respective data asset catalogs listing data assets.

It should be noted that arrows or edges between nodes represent connections of respective data assets. For example, data asset 1 (DA1) has a relationship with data source 1 (DS1), project 1 (P1), and data asset catalog 1 (C1). Data asset 2 (DA2) has a relationship with data source 1 (DS1), project 1 (P1), and data asset catalog 1 (C1). Data asset 3 (DA3) has a relationship with data source 2 (DS2), project 2 (P2), and data asset catalog 1 (C1). Data asset 4 (DA4) has a relationship with data source 3 (DS3), project 3 (P3), and data asset catalog 2 (C2). Data asset 5 (DA5) has a relationship with data source 3 (DS3), project 3 (P3), and data asset catalog 2 (C2). Data asset 6 (DA6) has a relationship with data source 4 (DS4), project 2 (P2), and data asset catalog 2 (C2).

Figure 5:
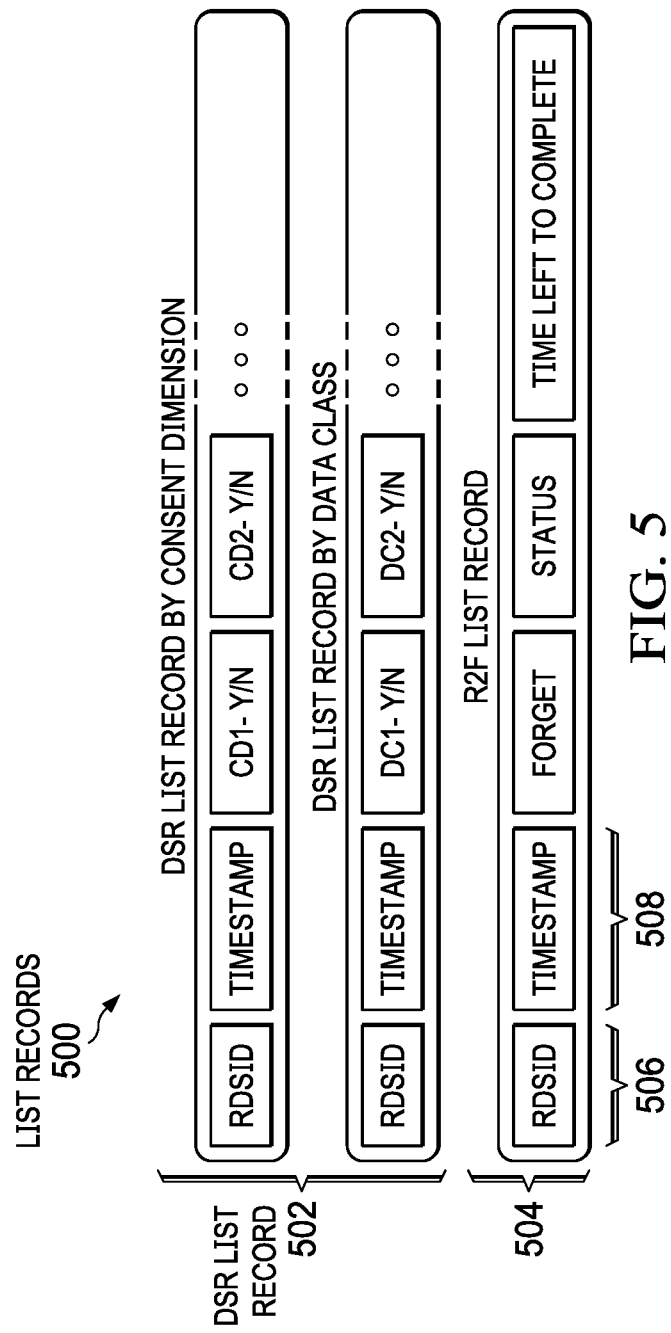
FIG. 5 is a diagram illustrating an example of records in a data subject request list and a right to forget list in accordance with an illustrative embodiment.

With reference now to FIG. 5, a diagram illustrating an example of records in a data subject request list and a right to forget list is depicted in accordance with an illustrative embodiment. List records 500 may be implemented in record storage, such as, for example, resolved data subject request list with consent dimensions and data classes and right to forget list storage 320 in FIG. 3. List records 500 include data subject request list record 502 and right to forget list record 504. Both of data subject request list record 502 and right to forget list record 504 represent a plurality of different records in a data subject request list and a right to forget list, respectively.

In addition, both of data subject request list record 502 and right to forget list record 504 include resolved data subject identifier 506 and timestamp 508. Resolved data subject identifier 506 uniquely identifies a resolved identity of a particular data subject corresponding to that particular record in the data subject request list and right to forget list. Timestamp 508 represents a time when that particular record was made.

Data subject request list record 502 also includes consent dimensions and data classes corresponding to that particular data subject associated with resolved data subject identifier 506. The consent dimensions may include any number of consent dimensions that indicate whether that particular data subject granted ("Y") or denied ("N") consent for each particular data dimension specific to a particular line of business of an enterprise contained in data subject request list record 502 to be used by a data consumer. The data classes may include any number of data classes that indicate whether that particular data subject granted ("Y") or denied ("N") consent for each particular data class of interest contained in data subject request list record 502 to be used by the data consumer. A consent dimension to data class processor, such as, for example, consent dimension to data class processor 314 in FIG. 3, actually looks at the data to match consent dimensions to data classes of interest.

In addition, right to forget list record 504 also includes forget, status, and time left to complete. Forget indicates that all data corresponding to that particular data subject is to be physically deleted. Status indicates whether the data has been deleted or not. Time left to complete indicates a grace period for data deletion.

With reference now to FIG. 6, a diagram illustrating an example of a data asset record is depicted in accordance with an illustrative embodiment. Data asset record 600 may be implemented in a data asset catalog, such as, for example, data asset catalog 328 in FIG. 3. It should be noted that data asset record 600 may represent a plurality of different data asset records in the data asset catalog. Also, data asset record 600 may be in, for example, second normal form.

In this example, data asset record 600 includes data asset identifier 602. Data asset identifier 602 uniquely identifies a particular data asset contained in the data asset catalog. Data asset record 600 also includes metadata, data classes, pseudo identifiers, personal identifiers, and Bloom filter identifiers corresponding to that particular data asset identified by data asset identifier 602 of data asset record 600.

With reference now to FIG. 7, a diagram illustrating an example of a resolved data subject identity longitudinal record is depicted in accordance with an illustrative embodiment. Resolved data subject identity longitudinal record 700 may be implemented in a data subject identity resolver, such as, for example, data subject identity resolver 318 in FIG. 3. It should be noted that resolved data subject identity longitudinal record 700 may represent a plurality of different resolved data subject identity longitudinal records in the data asset resolver.

In this example, resolved data subject identity longitudinal record 700 includes resolved data subject identifier 702, pseudo identifiers 704, and personal identifiers 706. Resolved data subject identifier 702 uniquely identifies a resolved identity of a particular data subject. Resolved data subject identifier 702 may be, for example, resolved data subject identifier 506 in FIG. 5. Pseudo identifiers 704 identify a set of zero or more pseudo identifiers corresponding to resolved data subject identifier 702 of that particular data subject. In this example, pseudo identifiers 704 include pseudo identifier 1 and pseudo identifier 2. However, pseudo identifiers 704 are only meant as an example and may include any number of pseudo identifiers including a null set. Personal identifiers 706 identify a set of zero or more personal identifiers corresponding to resolved data subject identifier 702 of that particular data subject. In this example, personal identifiers 706 include personal identifier 1 and personal identifier 2. However, personal identifiers 706 are only meant as an example and may include any number of personal identifiers including a null set.

Figure 8:
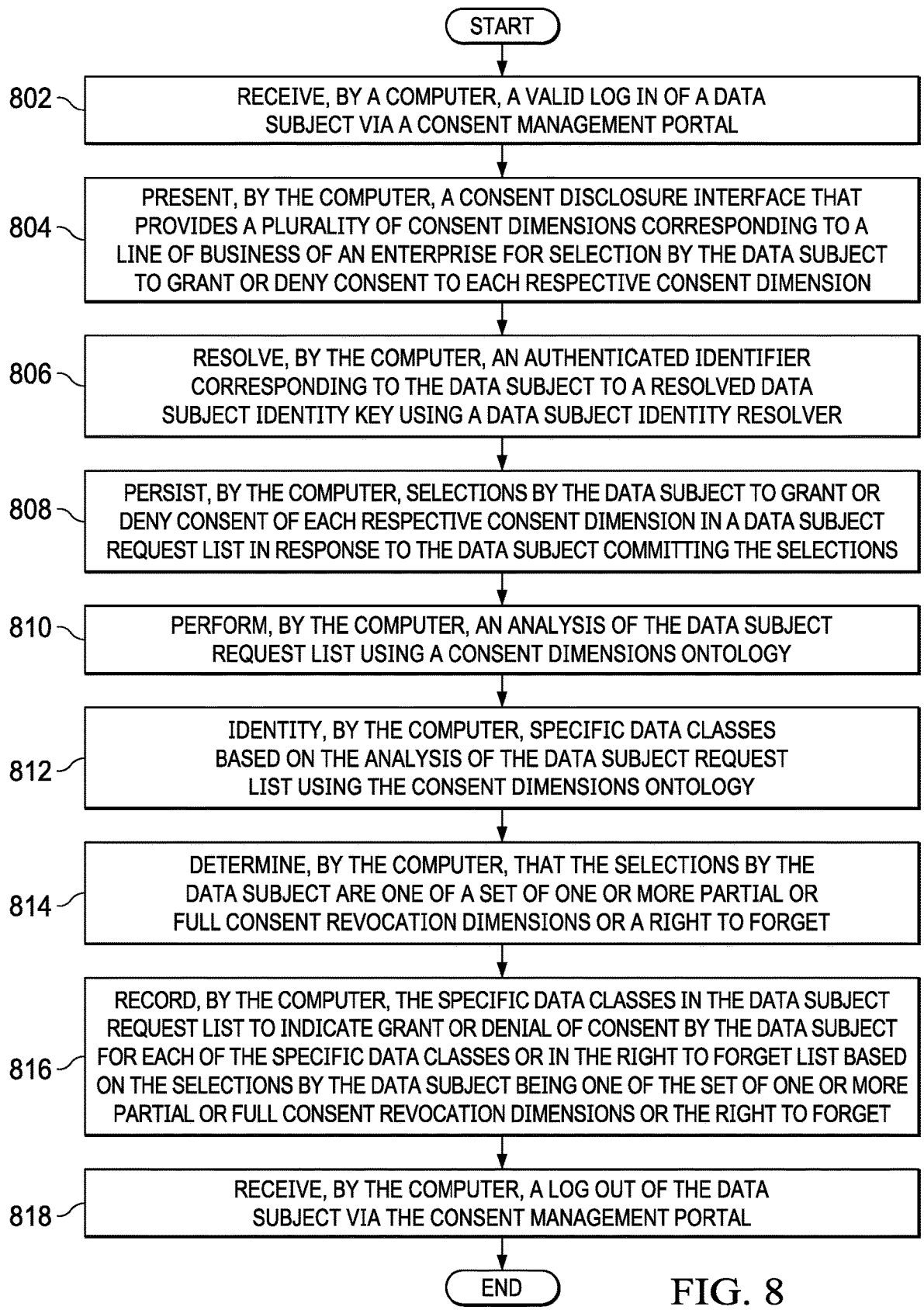
FIG. 8 is a flowchart illustrating a process for data subject request and right to forget consent management in accordance with an illustrative embodiment.

With reference now to FIG. 8, a flowchart illustrating a process for data subject request and right to forget consent management is shown in accordance with an illustrative embodiment. The process shown in FIG. 8 may be implemented in a computer, such as, for example, server 104 in FIG. 1 or data processing system 200 in FIG. 2. For example, the process shown in FIG. 8 may be implemented in or controlled by dynamic data dissemination manager 218 in FIG. 2.

The process begins when the computer receives a valid log in of a data subject via a consent management portal (step 802). The computer presents a consent disclosure interface that provides a plurality of consent dimensions corresponding to a line of business of an enterprise for selection by the data subject to grant or deny consent to each respective consent dimension (step 804). A consent dimension is specific to the particular line of business of the enterprise. Data subject consent is typically binary (i.e., either grant or deny). A single data subject consent may map to a plurality of data classes as defined and known to the line of business in a consent dimensions ontology. The computer resolves an authenticated identifier corresponding to the data subject to a resolved data subject identity key using a data subject identity resolver, such as, for example, data subject identity resolver 318 in FIG. 3 (step 806). The data subject identity resolver is, for example, a probabilistic identity resolver, a machine learning identity resolver, or the like. The computer persists selections by the data subject to grant or deny consent of each respective consent dimension in a data subject request list in response to the data subject committing the selections (step 808).

The computer performs an analysis of the data subject request list using the consent dimensions ontology (step 810). The computer identifies specific data classes based on the analysis of the data subject request list using the consent dimensions ontology (step 812). The computer determines that the selections by the data subject are one of a set of one or more partial or full consent revocation dimensions or a right to forget (step 814). It should be noted that the data subject request list and the data class list are keyed by a resolved identity of the data subject. Also, the data subject may indicate a partial revocation of consent or a full revocation of consent in the data subject request list. In addition, the data subject may indicate a right to forget in a separate right to forget list, which overrides all previous consent grants or revocations. The computer records the specific data classes in the data subject request list to indicate grant or denial of consent by the data subject for each of the specific data classes or in the right to forget list based on the selections by the data subject being one of the set of one or more partial or full consent revocation dimensions or the right to forget (step 816). The computer receives a log out of the data subject via the consent management portal (step 818). Thereafter, the process terminates.

Figure 9A:
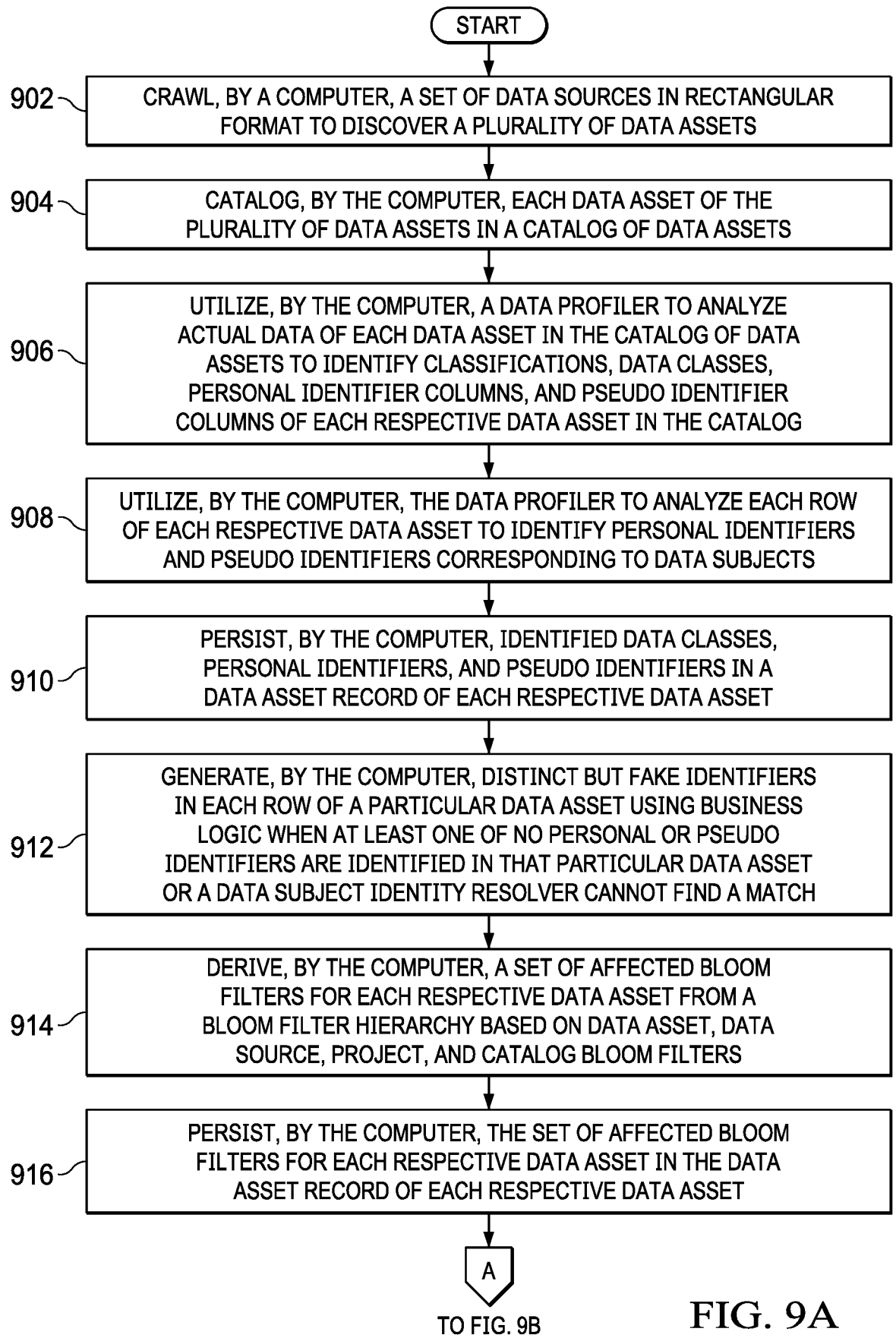
FIGS. 9A-9B are a flowchart illustrating a process for data ingestion, data profiling, and data subject discovery in accordance with an illustrative embodiment.
Figure 9B:
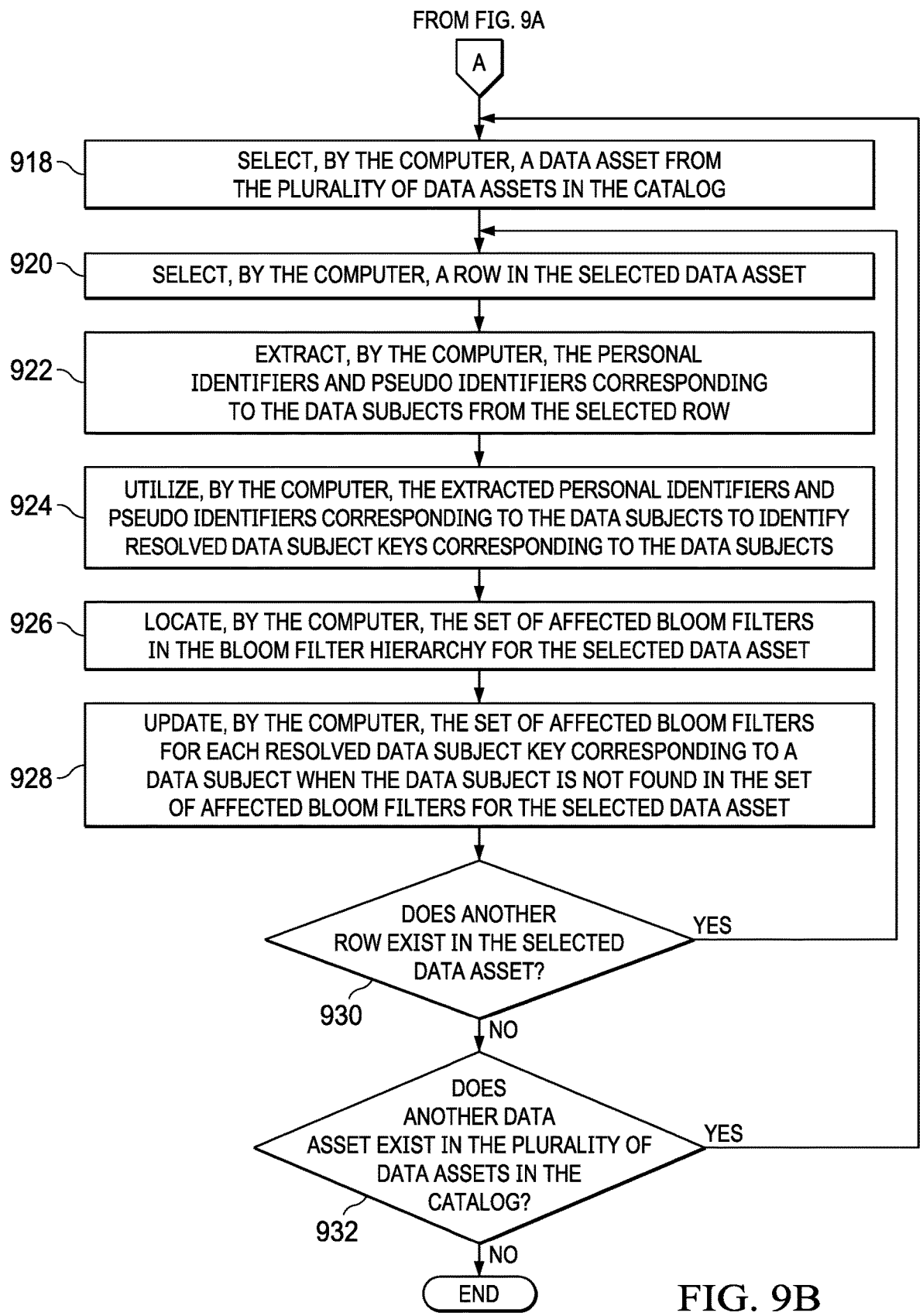

With reference now to FIGS. 9A-9B, a flowchart illustrating a process for data ingestion, data profiling, and data subject discovery is shown in accordance with an illustrative embodiment. The process shown in FIGS. 9A-9B may be implemented in a computer, such as, for example, server 104 in FIG. 1 or data processing system 200 in FIG. 2. For example, the process shown in FIGS. 9A-9B may be implemented in or controlled by dynamic data dissemination manager 218 in FIG. 2.

The process begins when the computer crawls a set of data sources to discover a plurality of data assets (step 902). It should be noted that the set of data sources may be in a structured (e.g., rectangular) format or an unstructured format. The set of data sources may be, for example, databases, NoSQL databases, files, and the like. The computer catalogs each data asset of the plurality of data assets in a catalog of data assets (step 904). A data asset may be, for example, a table comprised of columns and rows. The computer utilizes a data profiler to analyze actual data of each data asset in the catalog of data assets to identify classifications, data classes, personal identifier columns, and pseudo identifier columns of each respective data asset in the catalog (step 906). In addition, the computer utilizes the data profiler to analyze each row of each respective data asset to identify personal identifiers and pseudo identifiers corresponding to data subjects (step 908). It should be noted that the computer may perform this at the actual row cell level as well as a column level. Also, the computer may utilize, for example, named entity extractors, columnar semantic analyzers, columnar schema analyzers, columnar data classification, value pattern recognition, and the like to isolate individual values of potential data subject pseudo identifiers and personal identifiers from rows. In addition, the computer may utilize a data subject identity resolver to determine resolved data subject identities/keys.

The computer persists identified data classes, personal identifiers, and pseudo identifiers in a data asset record of each respective data asset (step 910). Further, the computer generates distinct but fake identifiers in each row of a particular data asset using business logic when at least one of no personal identifiers or pseudo identifiers are identified in that particular data asset or the data subject identity resolver cannot find a match (step 912). Furthermore, the computer derives a set of affected Bloom filters for each respective data asset from a Bloom filter hierarchy based on data asset, data source, project, and catalog Bloom filters (step 914). A data asset will affect at least three Bloom filters (i.e., a data asset specific Bloom filter, a data source specific Bloom filter where the data asset is stored, one or more catalog specific Bloom filters where the data asset is listed, and zero or more project specific Bloom filters where the data asset may be used). Also, to keep storage of Bloom filters reasonable, the computer utilizes a binary 64/128-bit integer to represent resolved identifiers corresponding to data subjects. The computer also persists the set of affected Bloom filters for each respective data asset in the data asset record of each respective data asset (step 916).

Afterward, the computer selects a data asset from the plurality of data assets in the catalog (step 918). Moreover, the computer selects a row in the selected data asset (step 920). The computer extracts the personal identifiers and pseudo identifiers corresponding to the data subjects from the selected row (step 922). The computer may utilize any type of extractor, such as, for example, long short-term memory network, attention network, pattern matching, named entity recognition, or the like. The computer utilizes the extracted personal identifiers and pseudo identifiers corresponding to the data subjects to identify resolved data subject keys corresponding to the data subjects (step 924). The computer may utilize, for example, a data subject identity resolver, such as data subject identity resolver 318 in FIG. 3 to perform step 924.

Subsequently, the computer locates the set of affected Bloom filters in the Bloom filter hierarchy for the selected data asset (step 926). The computer updates the set of affected Bloom filters for each resolved data subject key corresponding to a data subject when the data subject is not found in the set of affected Bloom filters for the selected data asset (step 928). Afterward, the computer makes a determination as to whether another row exists in the selected data asset (step 930). If the computer determines that another row does exist in the selected data asset, yes output of step 930, then the process returns to step 920 where the computer selects another row from the selected data asset. If the computer determines that another row does not exist in the selected data asset, no output of step 930, then the computer makes a determination as to whether another data asset exists in the plurality of data assets in the catalog (step 932). If the computer determines that another data asset does exist in the plurality of data assets in the catalog, yes output of step 932, then the process returns to step 918 where the computer selects another data asset from the plurality of data assets in the catalog. If the computer determines that another data asset does not exist in the plurality of data assets in the catalog, no output of step 932, then the process terminates thereafter.

Figure 10A:
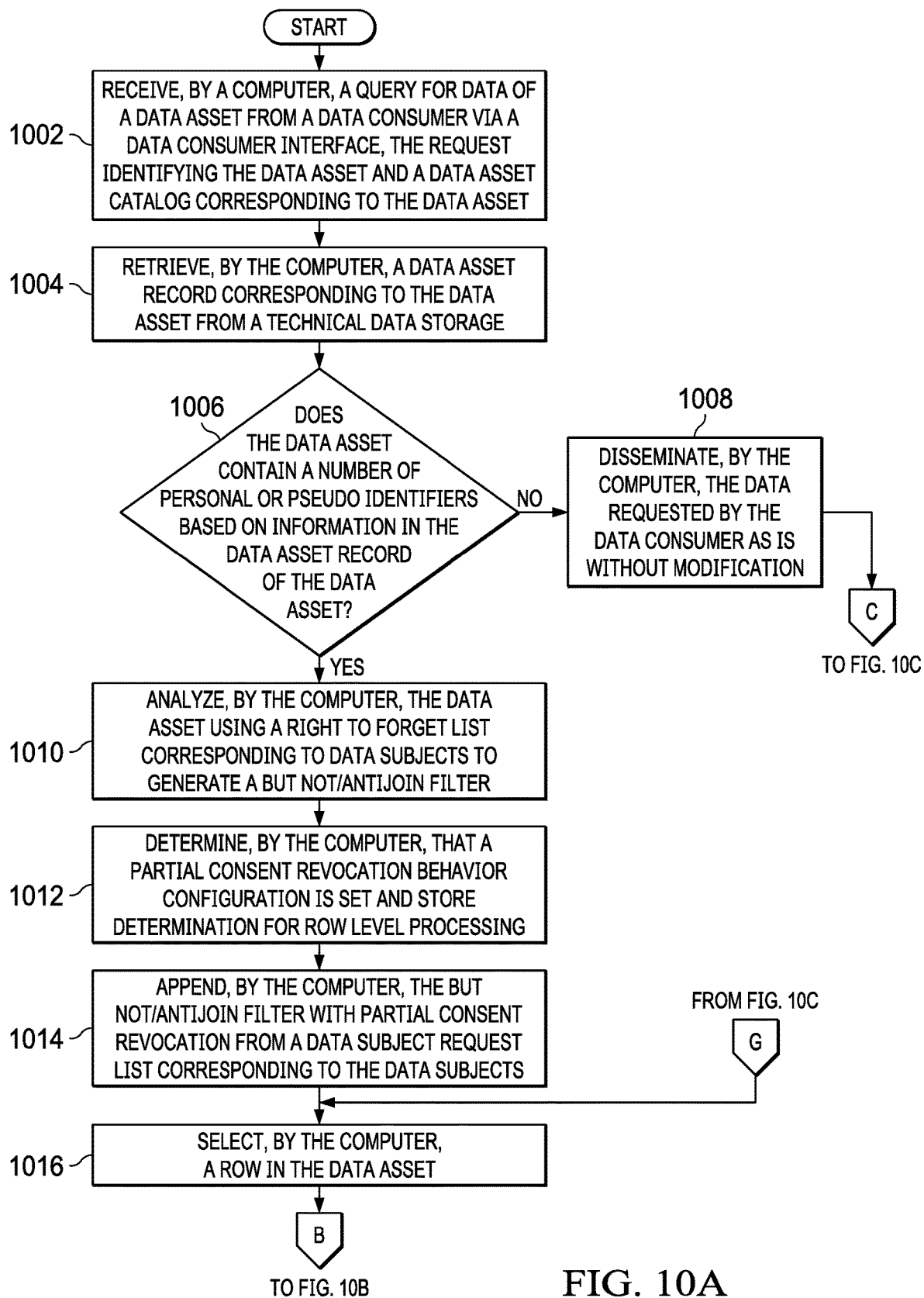
FIGS. 10A-10C are a flowchart illustrating a process for data dissemination in accordance with an illustrative embodiment.
Figure 10B:
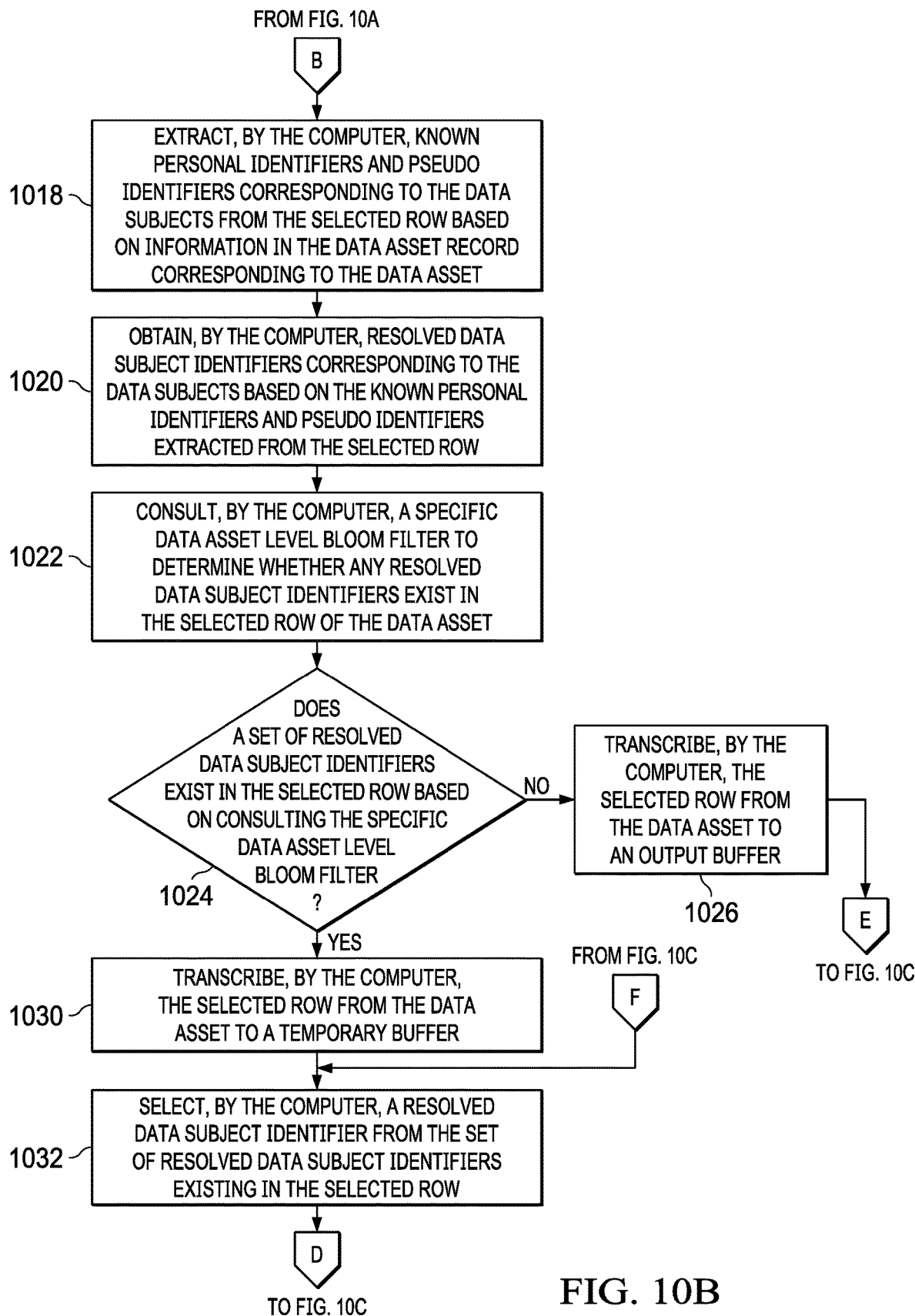
Figure 10C:
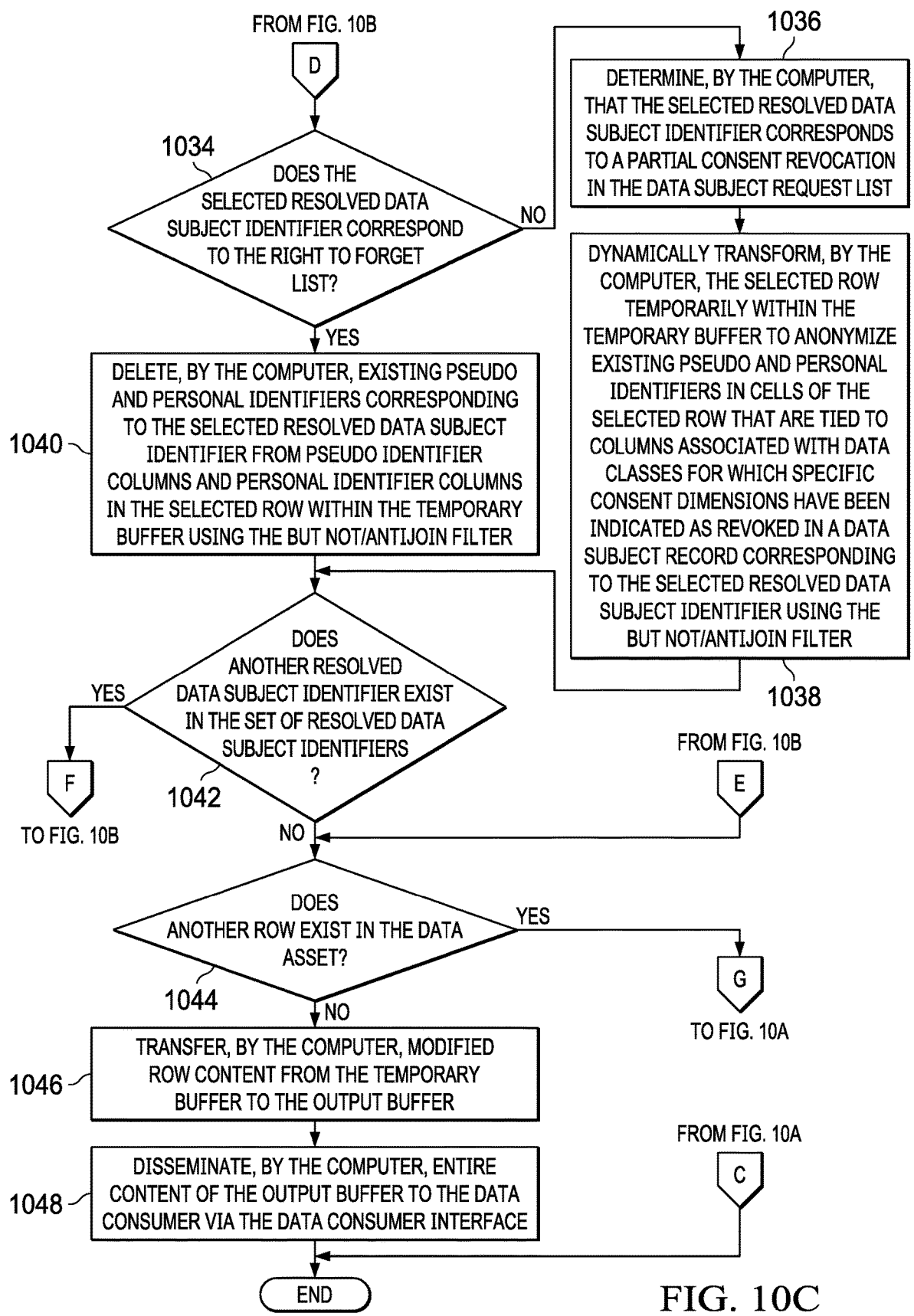

With reference now to FIGS. 10A-10C, a flowchart illustrating a process for data dissemination is shown in accordance with an illustrative embodiment. The process shown in FIGS. 10A-10C may be implemented in a computer, such as, for example, server 104 in FIG. 1 or data processing system 200 in FIG. 2. For example, the process shown in FIGS. 10A-10C may be implemented in or controlled by dynamic data dissemination manager 218 in FIG. 2. It should be noted that FIGS. 10A-10C describe row by row processing of a full scan of a data asset being requested in a query. Alternative illustrative embodiments can take advantage of the technical storage of the data asset to perform bulk antijoins for right to forget requests and inline user-defined functions to affect necessary transformations for partial consent revocation requests all encapsulated in a table expression when it is a relational database management system that is hosting the data.

The process begins when the computer receives a request to access data of a data asset from a data consumer via a data consumer interface (step 1002). The request identifies the data asset and a data asset catalog corresponding to the data asset. The computer retrieves a data asset record corresponding to the data asset from a technical data storage in response to receiving the request (step 1004).

Afterward, the computer makes a determination as to whether the data asset contains a number of personal identifiers or pseudo identifiers based on information in the data asset record of the data asset (step 1006). If the computer determines that the data asset does not contain a number of personal identifiers or pseudo identifiers based on information in the data asset record of the data asset, no output of step 1006, then the computer disseminates the data requested by the data consumer as is without modification (step 1008). Thereafter, the process terminates.

If the computer determines that the data asset does contain a number of personal identifiers or pseudo identifiers based on information in the data asset record of the data asset, yes output of step 1006, then the computer analyzes the data asset using a right to forget list corresponding to data subjects to generate a "but not"/antijoin filter (step 1010). The computer may obtain the right to forget list from a consent manager, such as, for example, consent manager 312 in FIG. 3. The computer can intercept and perform rewrites of data dissemination queries for specific data requests that add additional query filter predicates for all known resolved data subject identifiers in the right to forget list at data dissemination time.

The computer determines that a partial consent revocation behavior configuration is set and stores the determination for row level processing (step 1012). It should be noted that in steps 1010 and 1012 the computer matches the right to forget list and the partial consent revocation list to a Bloom filter at the data asset level of the Bloom filter hierarchy. The computer performs this by checking each entry in the right to forget list and each entry in the partial consent revocation list to determine whether and how to construct the Bloom filter in each respective case. The computer may optimize the row level processing by delivering entire row processing in bulk using an antijoin filter query rewrite in the technical data storage (e.g., a relational database management system) to affect right to forget instances and specific full row transformation for right to forget instances with conditional transformation using partial anonymization with stored procedures for data subject request partial consent revocation instances. These instances need data dissemination query rewrites for the specific technical data storage types. Also, for certain right to forget instances, the computer may perform data transformation instead of physical deletion by performing non-reversible data anonymization that is still usable by the data consumer. The computer appends the "but not"/antijoin filter with partial consent revocation from a data subject request list corresponding to the data subjects in response to determining that the partial consent revocation behavior configuration is set (step 1014).

Afterward, the computer selects a row in the data asset (step 1016). The computer extracts known personal identifiers and pseudo identifiers corresponding to the data subjects from the selected row based on information in the data asset record corresponding to the data asset (step 1018). The computer also obtains resolved data subject identifiers corresponding to the data subjects based on the known personal identifiers and pseudo identifiers extracted from the selected row to determine a unique number of distinct resolved data subject identifiers representing the data subjects (step 1020).

In addition, the computer consults a specific data asset level Bloom filter to determine whether any resolved data subject identifiers exist in the selected row of the data asset (step 1022). The computer makes a determination as to whether a set of resolved data subject identifiers exists in the selected row based on consulting the specific data asset level Bloom filter (step 1024). If the computer determines that a set of resolved data subject identifiers does not exist in the selected row based on consulting the specific data asset level Bloom filter, no output of step 1024, then the computer transcribes the selected row from the data asset to an output buffer (step 1026). Thereafter, the process proceeds to step 1044.

If the computer determines that a set of resolved data subject identifiers does exist in the selected row based on consulting the specific data asset level Bloom filter, yes output of step 1024, then the computer transcribes the selected row from the data asset to a temporary buffer (step 1030). The computer selects a resolved data subject identifier from the set of resolved data subject identifiers existing in the selected row (step 1032). The computer makes a determination as to whether the selected resolved data subject identifier corresponds to the right to forget list (step 1034).

If the computer determines that the selected resolved data subject identifier does not correspond to the right to forget list, no output of step 1034, then the computer determines that the selected resolved data subject identifier corresponds to a partial consent revocation in the data subject request list (step 1036). In response to the computer determining that the selected resolved data subject identifier corresponds to a partial consent revocation in the data subject request list, the computer dynamically transforms the selected row temporarily within the temporary buffer to anonymize existing pseudo and personal identifiers in cells of the selected row that are tied to columns associated with data classes for which specific consent dimensions have been indicated as revoked in a data subject record corresponding to the selected resolved data subject identifier using the appended "but not"/antijoin filter (step 1038). Thereafter, the process proceeds to step 1042.

Returning again to step 1034, if the computer determines that the selected resolved data subject identifier does correspond to the right to forget list, yes output of step 1034, then the computer deletes existing pseudo and personal identifiers corresponding to the selected resolved data subject identifier from pseudo identifier columns and personal identifier columns in the selected row within the temporary buffer using the "but not"/antijoin filter (step 1040). It should be noted that content of the temporary buffer can be skipped from being placing into the output buffer in step 1146. In other words, the delete implies discarding the content of the temporary row buffer or redacting the specific columns in the temporary buffer so that when it passes through step 1140 it is skipped and not passed to step 1146. Alternatively, the computer may perform row cell level data transformation to completely anonymize all of the personal identifiers and pseudo identifiers that exist in the selected row rather than outright physical deletion.

Afterward, the computer makes a determination as to whether another resolved data subject identifier exists in the set of resolved data subject identifiers (step 1042). If the computer determines that another resolved data subject identifier does exist in the set of resolved data subject identifiers, yes output of step 1042, then the process returns to step 1032 where the computer selects another resolved data subject identifier from the set of resolved data subject identifiers. If the computer determines that another resolved data subject identifier does not exist in the set of resolved data subject identifiers, no output of step 1042, then the computer makes a determination as to whether another row exists in the data asset (step 1044). If the computer determines that another row does exist in the data asset, yes output of step 1044, then the process returns to step 1016 where the computer selects another row from the data asset. If the computer determines that another row does not exist in the data asset, no output of step 1044, then the computer transfers modified row content from the temporary buffer to the output buffer (step 1046). Subsequently, the computer dynamically disseminates entire content of the output buffer to the data consumer via the data consumer interface (step 1048). Thereafter, the process terminates.

Figure 11A:
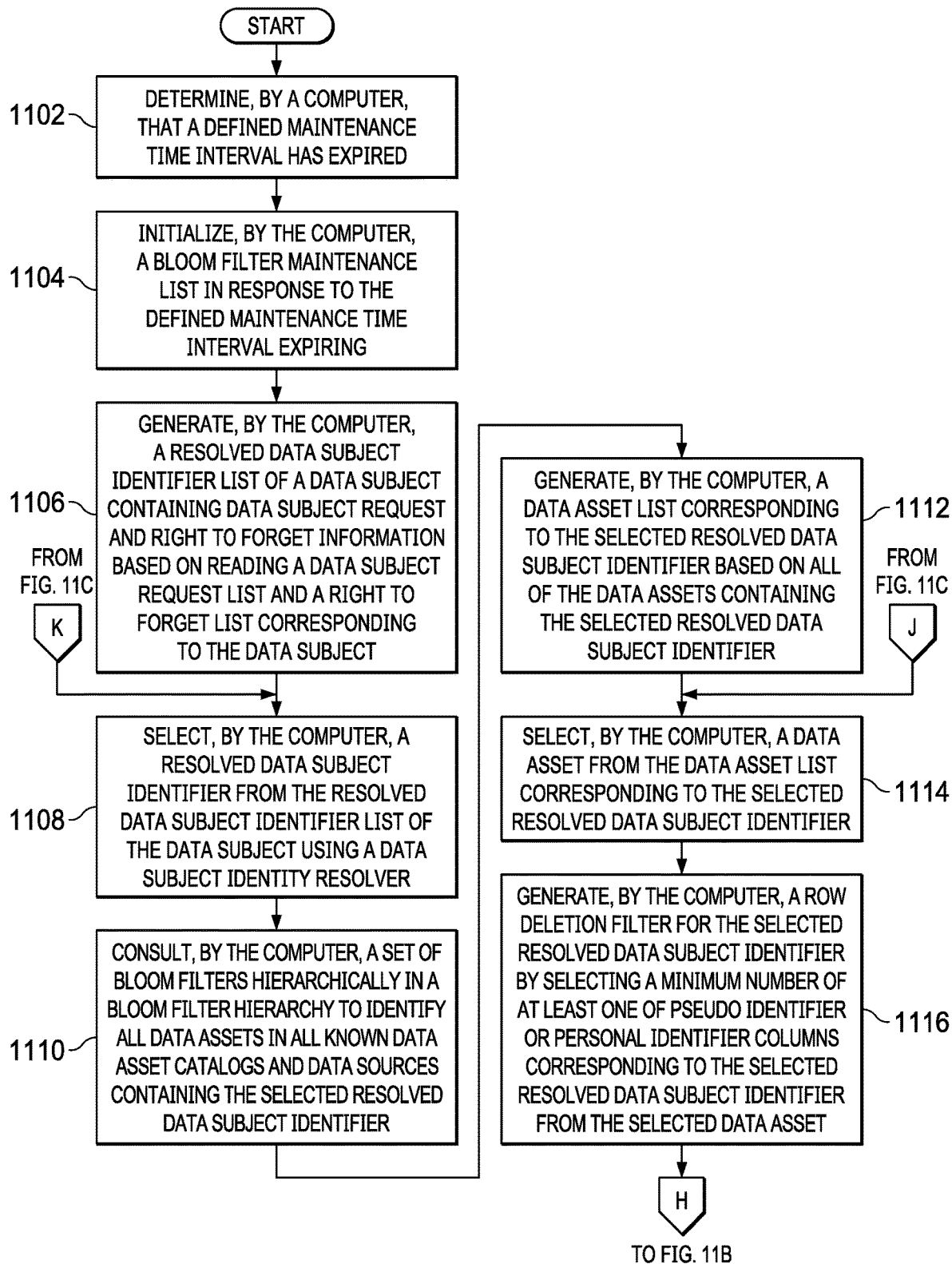
FIGS. 11A-11C is a flowchart illustrating a process for data subject list, right to forget list, and Bloom filter maintenance in accordance with an illustrative embodiment.
Figure 11B:
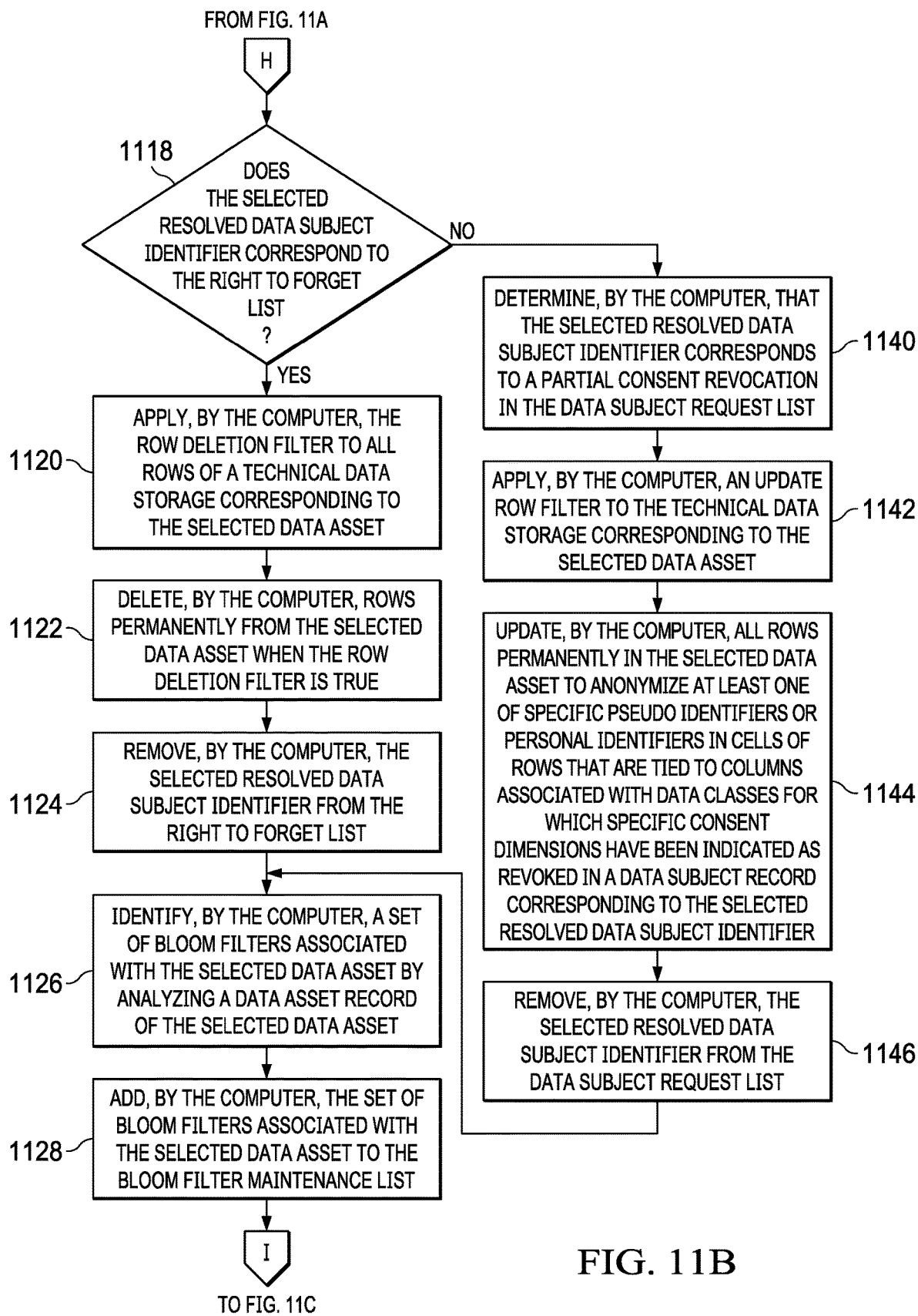
Figure 11C:
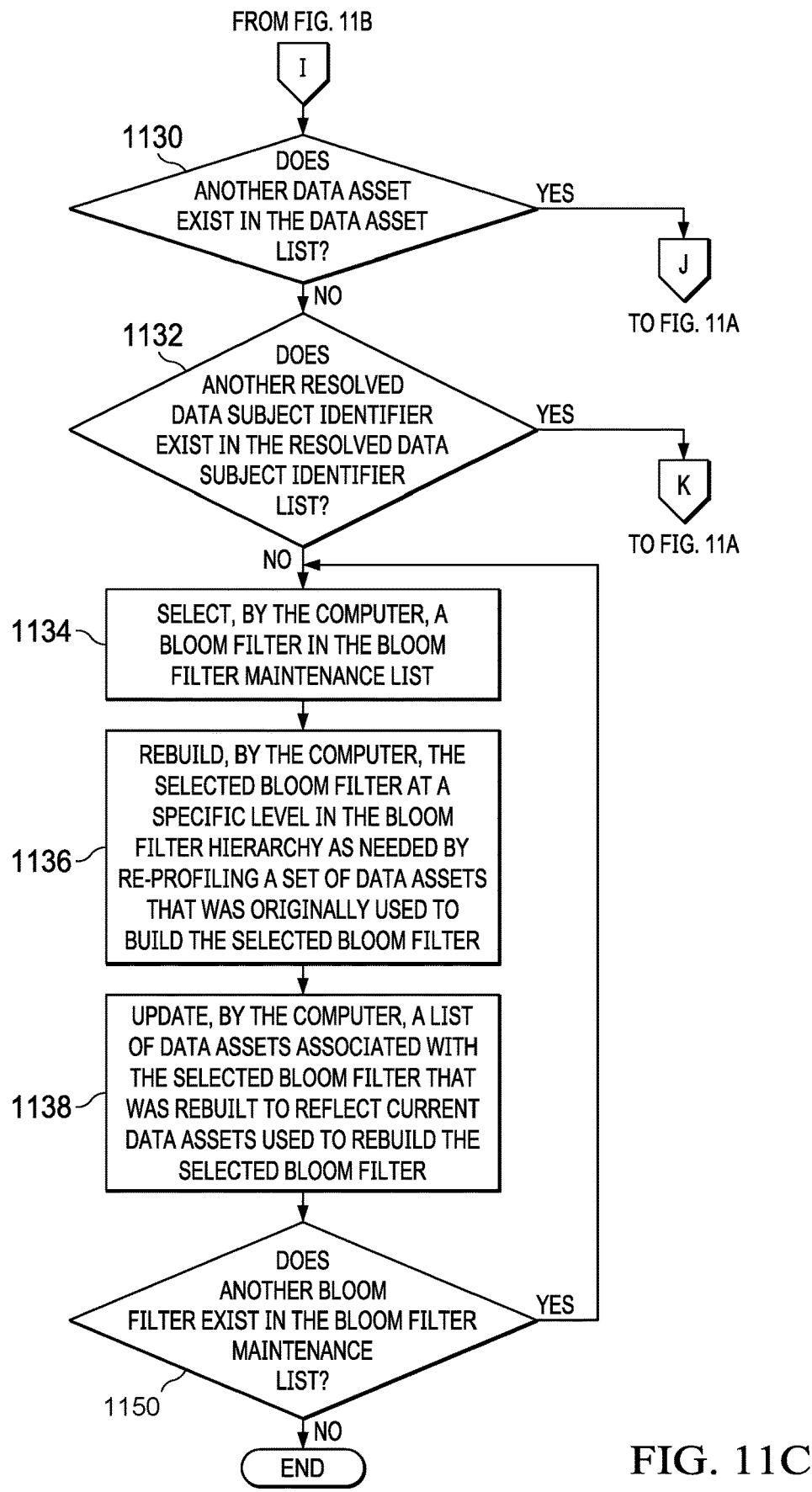

With reference now to FIGS. 11A-9C, a flowchart illustrating a process for data subject list, right to forget list, and Bloom filter maintenance is shown in accordance with an illustrative embodiment. The process shown in FIGS. 11A-9C may be implemented in a computer, such as, for example, server 104 in FIG. 1 or data processing system 200 in FIG. 2. For example, the process shown in FIGS. 11A-9C may be implemented in or controlled by dynamic data dissemination manager 218 in FIG. 2. The time interval for list maintenance is a tradeoff between governmental regulations (e.g., GDPR/CCPA) stipulated processing times and cost. Frequently, disseminated data plays a role in that dissemination. Frequently, disseminated data should be processed faster for right to forget requests where real purging of data subject information needs to be done. For partial or full consent dimension revocation, nothing needs to be done other than caching the Bloom filters for reuse.

The process begins when the computer determines that a defined maintenance time interval has expired (step 1102). The computer initializes a Bloom filter maintenance list in response to the defined maintenance time interval expiring (step 1104). The computer generates a resolved data subject identifier list of a data subject containing data subject request information and right to forget information based on reading a data subject request list and a right to forget list corresponding to the data subject (step 1106).

The computer selects a resolved data subject identifier from the resolved data subject identifier list of the data subject using a data subject identity resolver (step 1108). The computer consults a set of Bloom filters hierarchically in a Bloom filter hierarchy to identify all data assets in all known data asset catalogs and data sources containing the selected resolved data subject identifier (step 1110). The computer generates a data asset list corresponding to the selected resolved data subject identifier based on all of the data assets containing the selected resolved data subject identifier (step 1112).

The computer selects a data asset from the data asset list corresponding to the selected resolved data subject identifier (step 1114). The computer generates a row deletion filter for the selected resolved data subject identifier by selecting a minimum number of at least one of pseudo identifier columns or personal identifier columns corresponding to the selected resolved data subject identifier from the selected data asset (step 1116). It should be noted that the pseudo identifier columns or personal identifier columns may or may not be indexed in a technical data storage.

The computer makes a determination as to whether the selected resolved data subject identifier corresponds to the right to forget list (step 1118). If the computer determines that the selected resolved data subject identifier does correspond to the right to forget list, yes output of step 1118, then the computer applies the row deletion filter to all rows of the technical data storage corresponding to the selected data asset (step 1120). The technical data storage is able to support bulk delete by a specific simple or compound key as determined in step 916 for the specific data asset currently being processed from the data asset list determined in step 914. Illustrative embodiments are delete SQL statements with WHERE predicates used in relational database management systems and the like. In addition, the computer deletes rows permanently from the selected data asset when the row deletion filter is true (step 1122). Alternatively, the computer may perform row cell level data transformation to completely anonymize all of the personal identifiers and pseudo identifiers that exist in the selected data asset rather than outright physical deletion. Further, the computer removes the selected resolved data subject identifier from the right to forget list (step 1124). The computer may optimize the removal of resolved data subject identifiers from right to forget lists by delivering the deletions in bulk in the technical data storage.

Afterward, the computer identifies a set of Bloom filters associated with the selected data asset by analyzing a data asset record of the selected data asset (step 1126). The computer adds the set of Bloom filters associated with the selected data asset to the Bloom filter maintenance list (step 1128).

Subsequently, the computer makes a determination as to whether another data asset exists in the data asset list (step 1130). If the computer determines that another data asset does exist in the data asset list, yes output of step 1130, then the process returns to step 1114 where the computer selects another data asset from the data asset list. If the computer determines that another data asset does not exist in the data asset list, no output of step 1130, then the computer makes a determination as to whether another resolved data subject identifier exists in the resolved data subject identifier list (step 1132).

If the computer determines that another resolved data subject identifier does exist in the resolved data subject identifier list, yes output of step 1132, then the process returns to step 1108 where the computer selects another resolved data subject identifier from the resolved data subject identifier list. If the computer determines that another resolved data subject identifier does not exist in the resolved data subject identifier list, no output of step 1132, then the computer selects a Bloom filter in the Bloom filter maintenance list (step 1134). The computer rebuilds the selected Bloom filter at a specific level in the Bloom filter hierarchy as needed by reprofiling a set of data assets that was originally used to build the selected Bloom filter (step 1136). It should be noted that the computer performs step 1136 similar to FIGS. 9A-9B for the selected Bloom filter, but specifically involving steps 906-912. The need for periodic Bloom filter rebuilding/cleanup is due to false positives, deletions not supported by Bloom filters, and the like. Also, is should be noted that false negatives are benign in Bloom filters (e.g., do not have an affect). The computer updates the data asset list associated with the selected bloom filter that was rebuilt to reflect current data assets used to rebuild the selected bloom filter (step 1138). Afterward, the computer makes a determination as to whether another Bloom filter exists in the Bloom filter maintenance list (step 1150). If the computer determines that another Bloom filter does exist in the Bloom filter maintenance list, yes output of step 1150, then the process returns to step 1134 where the computer selects another Bloom filter from the Bloom filter maintenance list. If the computer determines that another Bloom filter does not exist in the Bloom filter maintenance list, no output of step 1150, then the process terminates thereafter.

Returning again to step 1118, if the computer determines that the selected resolved data subject identifier does not correspond to the right to forget list, no output of step 1118, then the computer determines that the selected resolved data subject identifier corresponds to a partial consent revocation in the data subject request list (step 1140). In addition, the computer applies an update row filter to the technical data storage corresponding to the selected data asset (step 1142). Further, the computer updates the row permanently in the selected data asset to anonymize at least one of specific pseudo identifiers or personal identifiers in cells of the row that are tied to columns associated with data classes for which specific consent dimensions have been indicated as revoked in a data subject record corresponding to the selected resolved data subject identifier (step 1144). Furthermore, the computer removes the selected resolved data subject identifier from the data subject request list (step 1146). Thereafter, the process returns to step 1126 where the computer identifies a set of Bloom filters associated with the selected data asset.

Thus, illustrative embodiments of the present invention provide a computer-implemented method, computer system, and computer program product for dynamic data dissemination based on declarative data subject constraints to protect data privacy using Bloom filters. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamic data dissemination, the computer-implemented method comprising:

receive, by the computer, a query for data of a data asset;
responsive to receipt of the query, performing the steps of:
selecting, by the computer, a resolved data subject identifier corresponding to a data subject from a set of resolved data subject identifiers existing in rows of the data asset;
responsive to the computer determining that the resolved data subject identifier does not correspond to a right to forget list, determining, by the computer, that the resolved data subject identifier corresponds to a partial consent revocation by the data subject in a data subject request list; and
transforming, by the computer, the rows to anonymize existing pseudo and personal identifiers in cells of the rows that are tied to columns associated with data classes for which specific consent dimensions have been indicated as revoked by the data subject in a data subject record corresponding to the resolved data subject identifier using an antijoin filter.

2. The computer-implemented method of claim 1 further comprising:

responsive to the computer determining that the resolved data subject identifier does correspond to the right to forget list, deleting, by the computer, the existing pseudo and personal identifiers corresponding to the resolved data subject identifier from pseudo identifier columns and personal identifier columns in the rows using the antijoin filter.

3. The computer-implemented method of claim 1 further comprising:

responsive to the computer determining that the set of resolved data subject identifiers does not exist in the rows based on consulting a data asset Bloom filter, transcribing, by the computer, the rows to an output buffer.

4. The computer-implemented method of claim 1 further comprising:
   selecting, by the computer, a row in the data asset to form a selected row;
   extracting, by the computer, known personal identifiers and pseudo identifiers corresponding to data subjects from the selected row based on information in a data asset record corresponding to the data asset;
   obtaining, by the computer, resolved data subject identifiers corresponding to the data subjects based on the known personal identifiers and pseudo identifiers extracted from the selected row; and
   consulting, by the computer, a data asset Bloom filter to determine whether any resolved data subject identifiers may exist in the selected row of the data asset.

5. The computer-implemented method of claim 1 further comprising:
   receiving, by the computer, a request to access data of the data asset from a data consumer, wherein the request identifies the data asset;
   retrieving, by the computer, a data asset record corresponding to the data asset; and
   determining, by the computer, whether the data asset contains a number of personal identifiers or pseudo identifiers based on information in the data asset record of the data asset.

6. The computer-implemented method of claim 5 further comprising:
   responsive to the computer determining that the data asset does not contain the number of personal identifiers or pseudo identifiers based on the information in the data asset record of the data asset, disseminating, by the computer, the data requested by the data consumer as is without modification.

7. The computer-implemented method of claim 5 further comprising:
   responsive to the computer determining that the data asset does contain the number of personal identifiers or pseudo identifiers based on the information in the data asset record of the data asset, analyzing, by the computer, the data asset using a right to forget list corresponding to data subjects to generate the antijoin filter;
   determining, by the computer, that a partial consent revocation behavior configuration is set; and
   appending, by the computer, the antijoin filter with the partial consent revocation from the data subject request list corresponding to the data subjects in response to determining that the partial consent revocation behavior configuration is set.

8. The computer-implemented method of claim 1 further comprising:
   utilizing, by the computer, a data profiler to analyze data of the data asset to identify data classes, personal identifier columns, and pseudo identifier columns of the data asset; and
   utilizing, by the computer, the data profiler to analyze each row of the data asset to identify personal identifiers and pseudo identifiers corresponding to the data subject.

9. The computer-implemented method of claim 1 further comprising:
   deriving, by the computer, a set of Bloom filters for the data asset from a Bloom filter hierarchy.

10. The computer-implemented method of claim 1 further comprising:
    receiving, by the computer, a valid log in of the data subject;
    presenting, by the computer, a consent disclosure interface that provides a plurality of consent dimensions corresponding to a line of business of an enterprise for selection by the data subject to grant or deny consent to each respective consent dimension, wherein a consent dimension is specific to the line of business of the enterprise;
    resolving, by the computer, an authenticated identifier corresponding to the data subject to the resolved data subject identifier; and
    persisting, by the computer, selections by the data subject to grant or deny consent of each respective consent dimension in the data subject request list in response to the data subject committing the selections.

11. The computer-implemented method of claim 10 further comprising:
    performing, by the computer, an analysis of the data subject request list using a consent dimensions ontology;
    identifying, by the computer, specific data classes based on the analysis of the data subject request list using the consent dimensions ontology; and
    recording, by the computer, the specific data classes in the data subject request list to indicate grant or denial of consent by the data subject for each of the specific data classes.

12. The computer-implemented method of claim 1, wherein the computer performs data dissemination query rewrite from a data consumer at data dissemination time.

13. A computer system for dynamic data dissemination, the computer system comprising:
    a bus system;
    a storage device connected to the bus system, wherein the storage device stores program instructions; and
    a processor connected to the bus system, wherein the processor executes the program instructions to:
        receive a query for data of a data asset; and
        responsive to receipt of the query, perform the steps of:
            select a resolved data subject identifier corresponding to a data subject from a set of resolved data subject identifiers existing in rows of a data asset;
            determine that the resolved data subject identifier corresponds to a partial consent revocation by the data subject in a data subject request list in response to determining that the resolved data subject identifier does not correspond to a right to forget list; and
            transform the rows to anonymize existing pseudo and personal identifiers in cells of the rows that are tied to columns associated with data classes for which specific consent dimensions have been indicated as revoked by the data subject in a data subject record corresponding to the resolved data subject identifier using an antijoin filter.

14. The computer system of claim 13, wherein the processor further executes the program instructions to:
    delete the existing pseudo and personal identifiers corresponding to the resolved data subject identifier from pseudo identifier columns and personal identifier columns in the rows using the antijoin filter in response to determining that the resolved data subject identifier does correspond to the right to forget list.

15. The computer system of claim 13, wherein the processor further executes the program instructions to:
- transcribe the rows from the data asset to an output buffer in response to determining that the set of resolved data subject identifiers does not exist in the rows based on consulting a data asset Bloom filter.

16. The computer system of claim 13, wherein the processor further executes the program instructions to:
- select a row in the data asset to form a selected row;
- extract known personal identifiers and pseudo identifiers corresponding to data subjects from the selected row based on information in a data asset record corresponding to the data asset;
- obtain resolved data subject identifiers corresponding to the data subjects based on the known personal identifiers and pseudo identifiers extracted from the selected row; and
- consult a data asset Bloom filter to determine whether any resolved data subject identifiers exist in the selected row of the data asset.

17. A computer program product for dynamic data dissemination, the computer program product comprising a computer-readable storage medium having program instructions embodied therewith, the program instructions executable by a computer to cause the computer to perform a method of:
- receive, by the computer, a query for data of a data asset; and
- responsive to receipt of the query, performing the steps of:
  - selecting, by the computer, a resolved data subject identifier corresponding to a data subject from a set of resolved data subject identifiers existing in rows of a data asset;
  - responsive to the computer determining that the resolved data subject identifier does not correspond to a right to forget list, determining, by the computer, that the resolved data subject identifier corresponds to a partial consent revocation by the data subject in a data subject request list; and
  - transforming, by the computer, the rows to anonymize existing pseudo and personal identifiers in cells of the rows that are tied to columns associated with data classes for which specific consent dimensions have been indicated as revoked by the data subject in a data subject record corresponding to the resolved data subject identifier using an antijoin filter.

18. The computer program product of claim 17 further comprising:
- responsive to the computer determining that the resolved data subject identifier does correspond to the right to forget list, deleting, by the computer, the existing pseudo and personal identifiers corresponding to the resolved data subject identifier from pseudo identifier columns and personal identifier columns in the rows using the antijoin filter.

19. The computer program product of claim 17 further comprising:
- responsive to the computer determining that the set of resolved data subject identifiers does not exist in the rows based on consulting a data asset Bloom filter, transcribing, by the computer, the rows to an output buffer.

20. The computer program product of claim 17 further comprising:
- selecting, by the computer, a row in the data asset to form a selected row;
- extracting, by the computer, known personal identifiers and pseudo identifiers corresponding to data subjects from the selected row based on information in a data asset record corresponding to the data asset;
- obtaining, by the computer, resolved data subject identifiers corresponding to the data subjects based on the known personal identifiers and pseudo identifiers extracted from the selected row; and
- consulting, by the computer, a data asset Bloom filter to determine whether any resolved data subject identifiers exist in the selected row of the data asset.

* * * * *